United States Patent
Lahmadi et al.

(10) Patent No.: US 10,592,206 B2
(45) Date of Patent: Mar. 17, 2020

(54) DISRUPTION INDEX FOR TRACKING DATABASE RECORDS

(71) Applicant: Amadeus S.A.S., Biot (FR)

(72) Inventors: Ghassen Lahmadi, Juan les Pins (FR); Pierre Pattard, Saint-Laurent-du-Var (FR); Sebastien Bardin, Vaucresson (FR); Anatole Laffitte, Mouans-Sartoux (FR); Amal Hjije, Antibes (FR); Caroline Ledroit, Mouans-Sartoux (FR)

(73) Assignee: AMADEUS S.A.S., Biot (FR)

( * ) Notice: Subject to any disclaimer, the term of this patent is extended or adjusted under 35 U.S.C. 154(b) by 301 days.

(21) Appl. No.: 15/398,966

(22) Filed: Jan. 5, 2017

(65) Prior Publication Data
US 2018/0189029 A1  Jul. 5, 2018

(51) Int. Cl.
*G06F 7/24*   (2006.01)
*G06Q 50/14*  (2012.01)
*G06Q 10/02*  (2012.01)

(52) U.S. Cl.
CPC .............. *G06F 7/24* (2013.01); *G06Q 10/02* (2013.01); *G06Q 50/14* (2013.01)

(58) Field of Classification Search
CPC . G06F 7/14; G06F 16/21; G06F 16/23; G06F 16/24; G06F 7/24; G06Q 50/14; G06Q 10/02
See application file for complete search history.

(56) References Cited

U.S. PATENT DOCUMENTS

| | | | | |
|---|---|---|---|---|
| 7,769,610 B2* | 8/2010 | Liew | .................... | G06Q 10/025 705/1.1 |
| 8,190,610 B2* | 5/2012 | Dasdan | ................. | G06F 16/278 707/737 |
| 8,209,200 B2* | 6/2012 | Sokel | .................... | G06Q 10/02 705/5 |

(Continued)

FOREIGN PATENT DOCUMENTS

EP    2881901 A1    6/2015

OTHER PUBLICATIONS

European Patent Office, International Search Report and Written Opinion dated Feb. 13, 2018 in International Application No. PCT/EP2018/050241.

*Primary Examiner* — Miranda Le
(74) *Attorney, Agent, or Firm* — Thompson Hine LLP

(57) ABSTRACT

Systems, methods, and computer program products for processing database records. A database management system may receive a query identifying a ticket in a ticket database that is being exchanged. In response to receiving the query, the database management system may retrieve, from a transitional database, a transitional record that is indexed to the ticket. The transitional record may include a disruption index having one or more arrays each defining a set of linked data elements. The database management system may retrieve additional tickets from the ticket database that are identified by the data elements, and arrange the tickets into an ordered set that defines a disruption history for the ticket being exchanged. The database management system may then generate a hybrid itinerary based on the disruption history, and use the hybrid itinerary to determine a value for the ticket being exchanged.

10 Claims, 24 Drawing Sheets

(56) References Cited

U.S. PATENT DOCUMENTS

| | | | | |
|---|---|---|---|---|
| 8,504,281 B2* | 8/2013 | Brennan | G08G 5/003 | 701/120 |
| 8,515,874 B2* | 8/2013 | Blair | G06Q 10/02 | 705/64 |
| 8,700,435 B2* | 4/2014 | Harris | G06Q 10/02 | 705/1.1 |
| 8,731,980 B2* | 5/2014 | Williamson | G06Q 50/14 | 705/5 |
| 8,762,184 B2* | 6/2014 | Rayner | G06Q 10/025 | 705/5 |
| 2002/0091554 A1* | 7/2002 | Burrows | G06Q 10/02 | 705/5 |
| 2004/0039613 A1* | 2/2004 | Maycotte | G06Q 10/02 | 705/5 |
| 2005/0240452 A1* | 10/2005 | Breed | G06Q 10/02 | 705/5 |
| 2007/0168236 A1* | 7/2007 | de Marcken | G06Q 10/02 | 705/5 |
| 2007/0233530 A1* | 10/2007 | Blaszka | G06Q 30/06 | 705/6 |
| 2008/0027768 A1* | 1/2008 | Thurlow | G06Q 10/025 | 705/6 |
| 2008/0114621 A1* | 5/2008 | Berthaud | G06Q 10/02 | 705/5 |
| 2008/0120314 A1* | 5/2008 | Yang | G06F 16/2456 | |
| 2008/0162196 A1* | 7/2008 | Espinosa | G06Q 10/02 | 705/5 |
| 2010/0250291 A1* | 9/2010 | Walker | G06Q 10/02 | 705/5 |
| 2011/0251861 A1* | 10/2011 | Cundle | G06Q 10/02 | 705/5 |
| 2012/0053969 A1* | 3/2012 | Schukraft | G06Q 10/02 | 705/5 |
| 2015/0161690 A1* | 6/2015 | Collendavelloo | G06Q 30/04 | 705/30 |
| 2016/0307281 A1 | 10/2016 | Canis et al. | | |
| 2016/0335567 A1* | 11/2016 | Petersen | G06Q 10/025 | |

* cited by examiner

```
89DRGH ～62                                    ～60～
SMITH/JOHN ～64
S1 AF7711 Y 19MAR NCECDG 0710 0845 ～65
S2 AF3628 Y 19MAR CDGJFK 1045 1420 ～66
```

FIG. 3

```
TKT-001  ～72                                  ～70～
LOC-89DRGH ～74
SMITH/JOHN ～76
C1  AF7711 Y 19MAR 0710 NCECDG O ～78
C2  AF3628 Y 19MAR 1045 CDGJFK O ～79
FC1 80 USD ～82
FC2 70 USD ～83
```

FIG. 4

```
89DRGH ～62                                    ～61～
SMITH/JOHN ～64
S1 AF6611 Y 19MAR NCEBER 0700 0830 ～67
S2 AF5677 Y 19MAR BERCDG 0900 1015 ～68
S3 AF3628 Y 19MAR CDGJFK 1045 1420 ～69
```

FIG. 5

```
TKT-001  ~72                              ~71~
LOC-89DRGH  ~74
SMITH/JOHN  ~76
C1   AF7711  Y  19MAR  0710  NCECDG  E ~78
C2   AF3628  Y  19MAR  1045  CDGJFK  E ~79
FC1  80  USD ~82
FC2  70  USD ~83
```

```
TKT-002  ~92                              ~90~
LOC-89DRGH  ~94
SMITH/JOHN  ~96
C1   AF6611  Y  19MAR  0700  NCEBER  O ~98
C2   AF5677  Y  19MAR  0900  BERCDG  O ~99
C3   AF3628  Y  19MAR  1045  CDGJFK  O ~100
FC1 ~102
FC2  80  USD ~103
FC3  70  USD ~104
```

FIG. 6

```
TKT-001  ~72                              ~73~
LOC-89DRGH  ~74
SMITH/JOHN  ~76
C1   AF7711  Y  19MAR  0710  NCECDG  E ~78
C2   AF3628  Y  19MAR  1045  CDGJFK  O ~79
FC1  80  USD ~82
FC2  70  USD ~83
```

```
TKT-002  ~92                              ~91~
LOC-89DRGH  ~94
SMITH/JOHN  ~96
C1   AF6611  Y  19MAR  0700  NCEBER  O ~98
C2   AF5677  Y  19MAR  0900  BERCDG  O ~99
FC1 ~102
FC2  80  USD ~103
```

FIG. 7

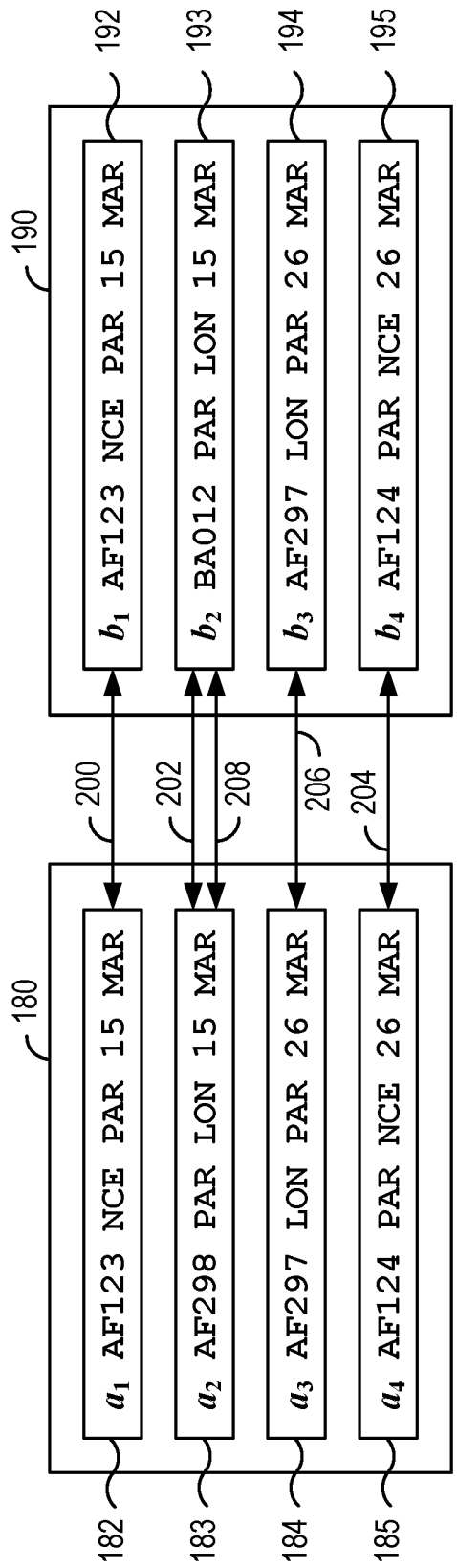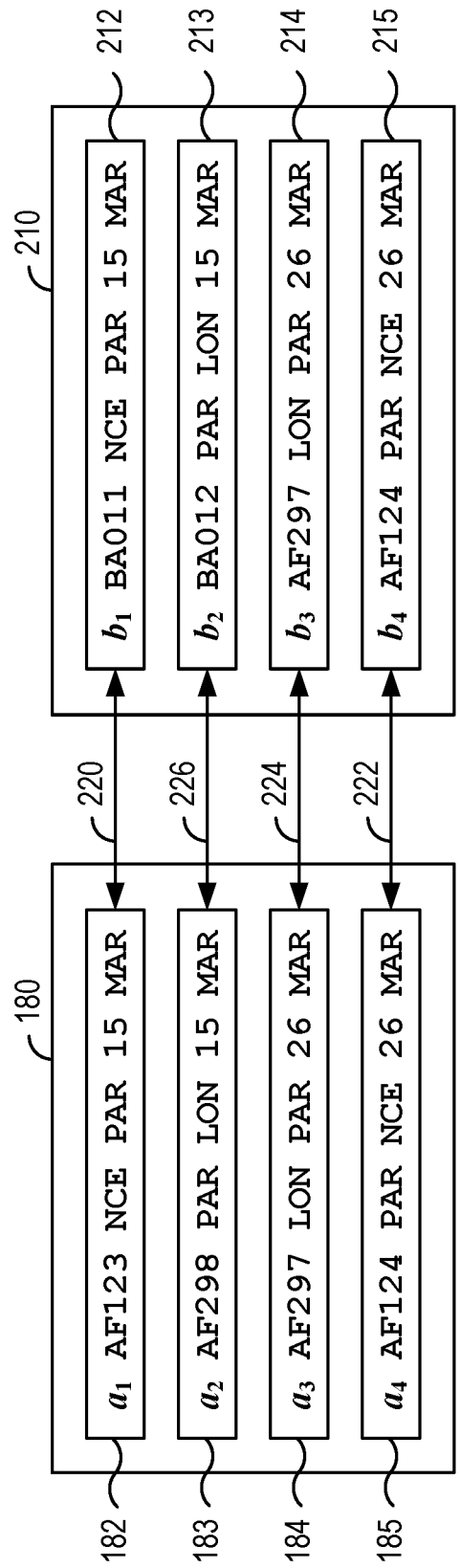

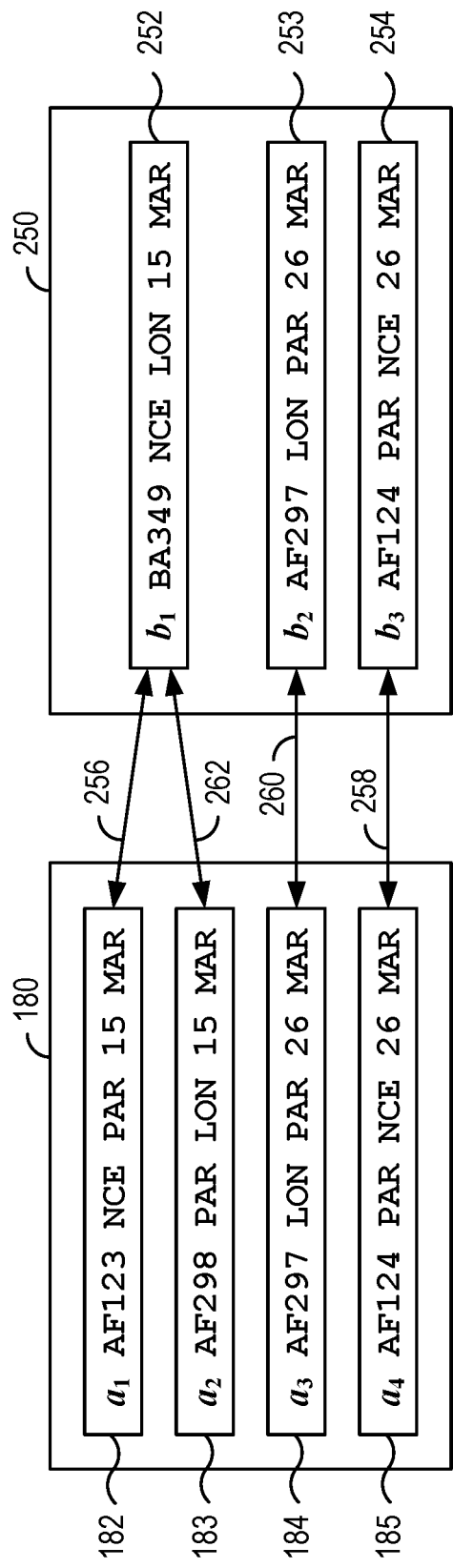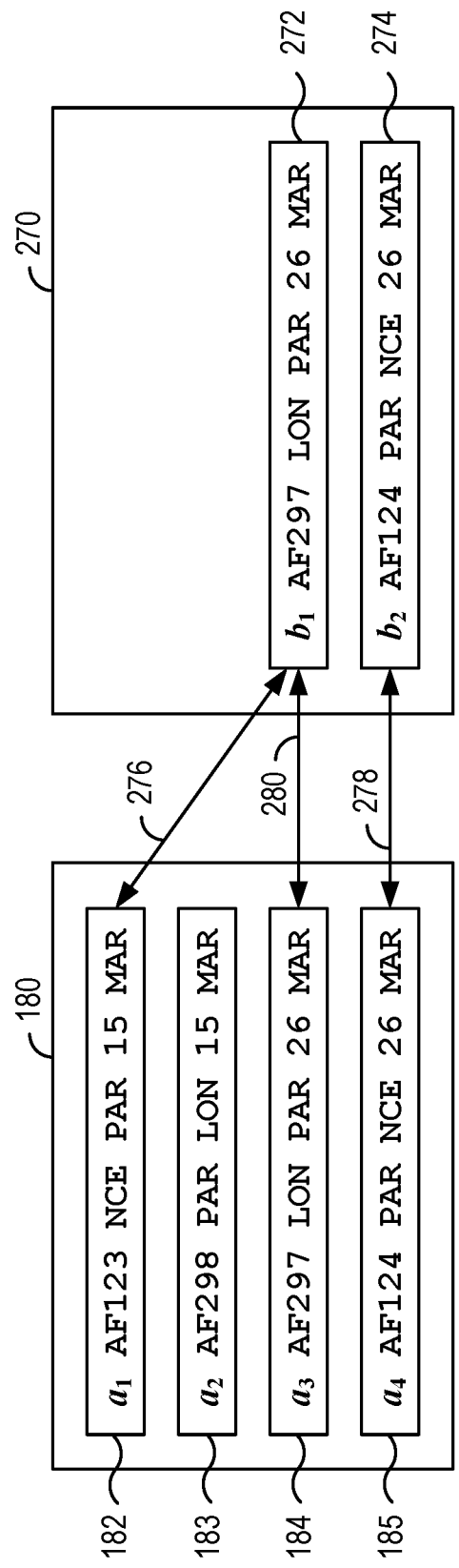

```
89DRGH ~62                                    ~63~
SMITH/JOHN ~64
S1 AF6611 Y 19MAR NCEBER 0700 0830 ~66
S2 AF5677 Y 19MAR BERCDG 0900 1015 ~67
S3 AF1680 Y 19MAR CDGLHR 1130 1215 ~330
S4 AF1481 Y 19MAR LHRCDG 1345 1720 ~332
```

```
TKT-002 ~92                                   ~93~
LOC-89DRGH ~94
SMITH/JOHN ~96
C1  AF6611 Y 19MAR 0700 NCEBER E ~98
C2  AF5677 Y 19MAR 0900 BERCDG E ~99
C3  AF3628 Y 19MAR 1045 CDGJFK E ~100
FC1 ~102
FC2 80 USD ~103
FC3 70 USD ~104
```

```
TKT-003 ~342
LOC-89DRGH ~344                               ~340~
SMITH/JOHN ~346
C1  AF6611 Y 19MAR 0700 NCEBER O ~348
C2  AF5677 Y 19MAR 0900 BERCDG O ~349
C3  AF1680 Y 19MAR 1130 CDGLHR O ~350
C4  AF1481 Y 19MAR 1345 LHRJFK O ~351
FC1 ~356
FC2 80 USD ~357
FC3 ~358
FC4 70 USD ~359
```

FIG. 20

```
TKT-001 ~372                                           ~370~
LOC-89DRGH ~374
SMITH/JOHN ~376
C1  AF7711  Y  19MAR  0710  NCECDG  O   ~378
C2  AF3628  Y  19MAR  1045  CDGJFK  O   ~379

FARE  CALC  NCE  CDG  80  JFK  70 ~382
FC1  80  USD ~384
FC2  70  USD ~386
```

```
TKT-002 ~402                                           ~400~
LOC-89DRGH ~404
                                      ,408
SMITH/JOHN ~406
C1  AF6611  Y  19MAR  0700  NCEBER  O  (DIS TKT-001 C1)
C2  AF5677  Y  19MAR  0900  BERCDG  O  (DIS TKT-001 C1)
C3  AF3628  Y  19MAR  1045  CDGJFK  O  (TKT-001 C2)
                                  \_410                    409
FARE  CALC  NCE  CDG  80  JFK  70 ~414
FC1  80  USD  FOR TKT-001 C1 ~416
FC2  70  USD  FOR TKT-001 C2 ~418

TKT-001 C1 NCE CDG *DIS ~420
TKT-001 C2 CDG JFK ~422
```

FIG. 22

```
TKT-003  ~432
LOC-89DRGH  ~434
SMITH/JOHN  ~436
C1 AF6611 Y 19MAR 0700 NCEBER O    (DIS TKT-001 C1)  (TKT-002 C1)  ~438
C2 AF5677 Y 19MAR 0900 BERCDG O    (DIS TKT-001 C1)  (TKT-002 C2)  ~439
C3 AF1680 Y 19MAR 1130 CDGLHR O    (TKT-001 C2)      (DIS TKT-002 C3)  ~440
C4 AF1481 Y 19MAR 1345 LHRJFK O    (TKT-001 C2)      (DIS TKT-002 C3)  ~441

FARE CALC NCE CDG 80 JFK 70  ~446
FC1 80 USD FOR TKT-001 C1  ~448
FC2 70 USD FOR TKT-001 C2  ~450

TKT-001 C1 NCE CDG *DIS  ~452
TKT-001 C2 CDG JFK *DIS  ~454
```

```
TKT-003 ~432                                    ~460~
LOC-99XXXX ~434
SMITH/JOHN ~436
C1 AF6611 Y 19MAR 0700 NCEBER O DIS ~438
C2 AF5677 Y 19MAR 0900 BERCDG O DIS ~439
C3 AF1680 Y 19MAR 1130 CDGLHR O DIS ~440
C4 AF1481 Y 19MAR 1345 LHRJFK O DIS ~441

FARE CALC NCE CDG 80 JFK 70 ~446
FC1 80 USD FOR C1, C2 ~462
FC2 70 USD FOR C3, C4 ~464
```

FIG. 24

```
TKT-004 ~502                                    ~500~
LOC-68GHJK ~504
JONES/JACKIE ~506
C1 WN4491 Y 19MAR 0700 SDFMDW F ~508
C2 WN1132 Y 19MAR 0800 MDWDEN O ~509
C3 WN3344 Y 19MAR 1120 DENLAX O ~510
SDF MID 258.00 DEN 258.00 LAX 258.00 ~512
```

FIG. 25

```
TKT-004  ~502                                    ~501~
LOC-68GHJK  ~504
JONES/JACKIE  ~506
C1 WN4491 Y 19MAR 0700 SDFMID F ~508
C2 WN1132 Y 19MAR 0800 MDWDEN E ~509
C3 WN3344 Y 19MAR 1120 DENLAX O ~510
SDF MID 258.00 DEN 258.00 LAX 258.00 ~512
```

```
TKT-005  ~522                                    ~520~
LOC-68GHJK  ~524
JONES/JACKIE  ~526
C1 WN0984 Y 19MAR 0800 MDWSTL O ~528
C2 WN0024 Y 19MAR 0900 STLDEN O ~530    ~532
I 19MAR16 SDF MID 258.00 DEN 258.00 LAX 258.00
```

FIG. 26

```
TKT-004  ~502                                    ~503~
LOC-68GHJK  ~504
JONES/JACKIE  ~506
C1 WN4491 Y 19MAR 0700 SDFMDW F ~508
C2 WN1132 Y 19MAR 0800 MDWDEN E ~509
C3 WN3344 Y 19MAR 1120 DENLAX O ~510
SDF MID 258.00 DEN 258.00 LAX 258.00 ~512
```

```
TKT-005  ~522                                    ~521~
LOC-68GHJK  ~524
JONES/JACKIE  ~526
C1 WN0984 Y 19MAR 0800 MDWSTL E ~528
C2 WN0024 Y 19MAR 0900 STLDEN O ~530    ~532
I 19MAR16 SDF MID 258.00 DEN 258.00 LAX 258.00
```

```
TKT-006  ~542                                    ~540~
LOC-68GHJK  ~544
JONES/JACKIE  ~546
C1 WN4071 Y 19MAR 0810 MDWSTL O ~548    ~550
I-19MAR16 SDF MID 258.00 DEN 258.00 LAX 258.00
```

FIG. 27

```
DUA' &
IRV+QT_ITI_PR+1' &         ~668~
IRV+TST+1' &
REF+PA:1+S:1+S:2'
DUB' &
IRV+QT_ITI+2' &
BLB+210++[data]
DUC' &
IRV+QT_FAR_COM+3' &
IRV+FAR_COM_NM+1' &
BLB+941[data]
DZC' &
REF+TKT:1+CPN:1+CPN:2' &
DZC' &
DUD' &
IRV+QT_ITI_CPN+4' &
IRV+ITI_CPN_NM+1' &
BLB+941++[data]
REF+S:1' &
DZD' &
REF+TKT:1+CPN:1' &
```

FIG. 31

```
fld{key: "QuotationType" uint: 13 ctn{
  fld{key: "Description" str: "QT_ITI_CPN" }}}
fld{key: "TicketingInfo" ctn {
  fld{ctn{
    fld{key: "State" str: "Current"}
    fld{key: "FlightReference" ctn{
      fld{ctn{
        fld{key: "Order" uint: 1}
        fld{key: "TicketNumber" str: "5268541401949"}
        fld{key: "DisruptionTag" str: "Y"}}}
```

DISRUPTION INDEX FOR TRACKING DATABASE RECORDS

BACKGROUND

The invention generally relates to computers and computer software and, in particular, to systems, methods, and computer program products for managing database records in a travel management system.

Travel management systems generally include one or more databases, with each database storing and organizing a plurality of record data structures, or "records". Database records maintained by a travel management system to manage a trip typically include a passenger name record (PNR) that stores data defining a travel itinerary, and one or more tickets that can be redeemed for boarding passes on transportation segments included in the travel itinerary.

In the context of air travel, a travel itinerary may include one or more segments that connect an origin location and a destination location. Each segment may refer to operation of a flight between one point where travelers first board an aircraft, and another point where the travelers leave the aircraft. A segment may include one or more legs, with each leg comprising operation of the aircraft from one scheduled departure station to a next scheduled arrival station. The travel itinerary may include multiple connected segments, with the traveler changing planes at each connection point between consecutive segments.

At times, a traveler with an issued ticket may be forced to alter their itinerary. For example, following an event that affects scheduling of a segment (e.g., cancellation of a flight connecting two locations), a traveler with a travel itinerary that includes the disrupted segment may need to modify their travel itinerary. The modification may include replacing the disrupted segment, or a combination of segments including the disrupted segment, with one or more replacement segments. Once a suitable solution is found, a new ticket may be issued based on the modified itinerary. This new ticket may be exchanged for all or a part of the previously held ticket. Typically, the traveler is not charged for this exchange.

Normal processes for updating database records in the travel management system are often bypassed for involuntary changes so that boarding passes can be issued quickly and without charge to the stranded traveler. This may result in database records that are inaccurate. Inaccurate database records can be particularly troublesome if another change in the itinerary is desired subsequent to an involuntary exchange.

Thus, improved systems, methods, and computer program products are needed to manage database records in travel management systems to maintain the accuracy of databases in the event of an involuntary ticket exchange, and to increase the speed and efficiency with which relevant data is retrieved from the databases.

SUMMARY

In an embodiment, a system is provided that includes one or more processors and a memory coupled to the processors. The memory may store program code that, when executed by at least one of the processors, causes the system to receive a query identifying a first database record stored in a first database, and retrieve, from a second database, a second database record indexed to the first database record. The second database record may contain a disruption index that includes at least one array which defines a set of linked data elements. The program code may further cause the system to identify a set of database records in the first database that include at least one of the linked data elements. The set of database records that includes at least one of the linked data elements may include the first database record and a third database record. The program code may further cause the system to generate a first array from the set of database records by initializing the first array with data elements from the first database record, and adding at least one data element from the third database record to the first array.

In another aspect, the data elements from the first database record may include a first series of data elements ordered from an earliest data element to a latest data element, the third database record may include a second series of data elements ordered from the earliest data element to the latest data element, and the program code may further cause the system to generate the first array by selecting a latest previously unselected data element from the third database record and determining a status of the selected data element. In response to the status indicating the selected data element was exchanged, the program code may cause the system to set an exchange flag and discard the selected data element. In response to the status indicating the selected data element was not exchanged, the program code may cause the system to add the selected data element to one of a second array or a third array.

In another aspect, the program code may further cause the system to add the selected data element to one of the first array or the second array by adding the selected data element to the second array if the exchange flag is not set, and adding the selected data element to the third array if the exchange flag is set.

In another aspect, in response to the selected data element being the earliest data element of the third database record, the program code may further cause the system to update the first array by appending the second array to the first array before the earliest data element of the first array, and appending the third array to the first array after the latest data element of the first array.

In another aspect, each database record in the set of database records may have a timestamp indicating a time when the database record was added to the first database, and the set of database records may include a fourth database record having a timestamp that occurs after the timestamp of the third database record. In response to the status indicating the selected data element was exchanged, the program code may further cause the system to determine if the selected data element appears in a fare element of the fourth database record, and if the selected data element does not appear in the fare element of the fourth database record, abort processing of the database records.

In another aspect, the first series of data elements may include a set of coupons comprising a first ticket, and the second series of data elements may include a set of coupons comprising a second ticket.

In another aspect, the program code may further cause the system to generate a hybrid ticket from the first array, determine a first value for the hybrid ticket using a pricing engine, and assign the first value to the first database record.

In another aspect, the program code may further cause the system to determine a second value for a fourth database record for which the first database record is being exchanged using the pricing engine, determine a third value equal to a difference between the second value and the first value, and assign the third value to the fourth database record.

In another aspect, the program code may further cause the system to sort the set of database records based on the timestamp of each database record so that the set is configured as a series of database records ordered from the database record having an earliest timestamp to the database record having a latest timestamp.

In another embodiment, a method of processing database records is provided. The method may include receiving the query identifying the first database record stored in the first database, and retrieving, from the second database, the second database record indexed to the first database record and containing the disruption index that includes at least one array which defines the set of linked data elements. The method may further include identifying the set of database records in the first database that include at least one of the linked data elements. The set of database records that include at least one of the linked data elements may include the first database record and the third database record. The method may further include generating the first array from the set of database records by initializing the first array with data elements from the first database record, and adding at least one data element from the third database record to the first array.

In another aspect, the data elements from the first database record may include the first series of data elements ordered from the earliest data element to the latest data element, the third database record may include the second series of data elements ordered from the earliest data element to the latest data element. and the method may generate the first array by selecting the latest previously unselected data element from the third database record, determining the status of the selected data element, in response to the status indicating the selected data element was exchanged, setting the exchange flag and discarding the selected data element, and in response to the status indicating the selected data element was not exchanged, adding the selected data element to one of the second array or the third array.

In another aspect, the method may add the selected data element to one of the first array or the second array by adding the selected data element to the second array if the exchange flag is not set, and adding the selected data element to the third array if the exchange flag is set.

In another aspect, in response to the selected data element being the earliest data element of the third database record, the method may update the first array by appending the second array to the first array before the earliest data element of the first array, and appending the third array to the first array after the latest data element of the first array.

In another aspect, each database record in the set of database records may have the timestamp indicating the time when the database record was added to the first database, the set of database records may include the fourth database record having the timestamp occurring after the timestamp of the third database record, and the method may further include, in response to the status indicating the selected data element was exchanged, determining if the selected data element appears in the fare element of the fourth database record, and if the selected data element does not appear in the fare element of the fourth database record, aborting processing of the database records.

In another aspect, the first series of data elements may include the set of coupons comprising the first ticket, and the second series of data elements may include the set of coupons comprising the second ticket.

In another aspect, the method may further include generating the hybrid ticket from the first array, determining the first value for the hybrid ticket using the pricing engine, and assigning the first value to the first database record.

In another aspect, the method may include determining the second value for the fourth database record for which the first database record is being exchanged using the pricing engine, determining the third value equal to the difference between the second value and the first value, and assigning the third value to the fourth database record.

In another aspect, the method may further include sorting the set of database records based on the timestamp of each database record so that the set is configured as the series of database records ordered from the database record having the earliest timestamp to the database record having the latest timestamp.

In another aspect, the first array may define a hybrid itinerary.

In another embodiment, a computer program product for processing database records is provided. The computer program product may include a non-transitory computer-readable storage medium, and program code stored on the medium that, when executed by one or more processors, causes the processors to receive the query identifying the first database record stored in the first database, and retrieve, from the second database, the second database record indexed to the first database record and containing the disruption index that includes at least one array which defines the set of linked data elements. The program code may further cause the processors to identify the set of database records in the first database that include at least one of the linked data elements. The set of database records that include at least one of the linked data elements may include the first database record and the third database record. The program code may further cause the processors to generate the first array from the set of database records by initializing the first array with data elements from the first database record, and adding at least one data element from the third database record to the first array.

In another embodiment, a system is provided that includes one or more processors, and a memory coupled to the processors. The memory stores first data comprising an index for information retrieval from a database, and program code. When executed by at least one of the processors, the program code may cause the system to retrieve, from a first database record, first data defining a first set of parent coupons that has been exchanged for a second set of replacement coupons due to a disruption which impacted one or more of the parent coupons, and retrieve, from a second database record, second data defining the second set of replacement coupons. The program code may further cause the system to define a first array of operators each corresponding to a respective one of the parent coupons in the first set of parent coupons and indicating if the respective parent coupon corresponds to the disruption, define a second array of operators each corresponding to a respective one of the replacement coupons in the second set of replacement coupons and indicating if the respective replacement coupon corresponds to the disruption, and define a third array of links each linking at least one parent coupon in the first set to at least one replacement coupon of the second set. The program code may further cause the system to store the first array, the second array, and the third array in the index.

In another aspect, the third array may link each parent coupon in the first set to at least one replacement coupon in the second set, and link each replacement coupon in the second set to at least one parent coupon in the first set.

In another aspect, the parent coupons in each of the first set and the second set may be ordered chronologically, and the program code may cause the system to define the first array, the second array, and the third array by selecting an earliest parent coupon in the first set, selecting an earliest replacement coupon in the second set, comparing the selected parent coupon to the selected replacement coupon. In response to the selected parent coupon matching the selected replacement coupon, the program code may cause the system to add a first operator to the first array indicating the selected parent coupon does not correspond to the disruption, add a second operator to the second array indicating the selected replacement coupon does not correspond to the disruption, and add a first link to the third array linking the selected parent coupon to the selected replacement coupon.

In another aspect, the selected parent coupon and the selected replacement coupon may each be selected based on a counter, and the program code may further cause the system to, in response to the selected parent coupon matching the selected replacement coupon, increment the counter to select a next earliest parent coupon and a next earliest replacement coupon, and select the next earliest parent coupon and the next earliest replacement coupon for comparison based on the counter. The program code may further cause the system to increment the counter each time the selected parent coupon matches the selected replacement coupon.

In another aspect, the program code may further cause the system to, in response to the selected parent coupon not matching the selected replacement coupon, select a latest parent coupon in the first set, select a latest replacement coupon in the second set, and compare the latest parent coupon to the latest replacement coupon. In response to the latest parent coupon matching the latest replacement coupon, the program code may further cause the system to add a third operator to the first array indicating the latest parent coupon does not correspond to the disruption, add a fourth operator to the second array indicating the latest replacement coupon does not correspond to the disruption, and add a second link to the third array linking the latest parent coupon to the latest replacement coupon.

In another aspect, the program code may further cause the system to, in response to the latest parent coupon not matching the latest replacement coupon, add a fifth operator to the first array indicating the latest parent coupon corresponds to the disruption, add a sixth operator to the second array indicating the latest replacement coupon corresponds to the disruption, and add a third link to the third array linking the latest parent coupon to the latest replacement coupon.

In another aspect, the program code may further cause the system to, in response to the selected parent coupon matching the selected replacement coupon, determine if both a next earliest parent coupon exists in the first set, and a next earliest replacement coupon exists in the second set, and only add the first operator to the first array, the second operator to the second array, and the first link to the third array if both the next earliest parent coupon and the next earliest replacement coupon exist.

In another aspect, the program code may further cause the system to, in response to at least one of the next earliest parent coupon and the next earliest replacement coupon not existing, if the next earliest parent coupon exists, add, for each parent coupon remaining in the first set, a respective operator to the first array indicating that the respective parent coupon corresponds to the disruption. The program code may also cause the system to, in response to the at least one of the next earliest parent coupon and the next earliest replacement coupon not existing, if the next earliest replacement coupon exists, add, for each replacement coupon remaining in the second set, a respective operator to the second array indicating that the respective replacement coupon corresponds to the disruption.

In another aspect, the program code may further cause the system to, if the next earliest parent coupon exists, add, for each parent coupon remaining in the first set, a respective link to the third array linking the parent coupon to a latest replacement coupon in the second set, and if the next earliest replacement coupon exists, add, for each replacement coupon remaining in the second set, a respective link to the third array linking the replacement coupon to a latest parent coupon in the first set.

In another embodiment, a method of generating the index for information retrieval from the database is provided. The method may include retrieving, from the first database record, the first data defining the first set of parent coupons that has been exchanged for the second set of replacement coupons due to the disruption which impacted one or more of the parent coupons, and retrieving, from the second database record, the second data defining the second set of replacement coupons. The method may further include defining the first array of operators each corresponding to the respective one of the parent coupons in the first set of parent coupons and indicating if the respective parent coupon corresponds to the disruption, defining the second array of operators each corresponding to the respective one of the replacement coupons in the second set of replacement coupons and indicating if the respective replacement coupon corresponds to the disruption, and defining the third array of links each linking at least one parent coupon in the first set to at least one replacement coupon of the second set. The method may further include storing the first array, the second array, and the third array in the index.

In another aspect, the third array may link each parent coupon in the first set to at least one replacement coupon in the second set, and link each replacement coupon in the second set to at least one parent coupon in the first set.

In another aspect, the parent coupons in the first set and the replacement coupons in the second set may be ordered chronologically, and the first array, the second array, and the third array may be defined by selecting the earliest parent coupon in the first set, selecting the earliest replacement coupon in the second set, and comparing the selected parent coupon to the selected replacement coupon. In response to the selected parent coupon matching the selected replacement coupon, the method may add the first operator to the first array indicating the selected parent coupon does not correspond to the disruption, add the second operator to the second array indicating the selected replacement coupon does not correspond to the disruption, and add the first link to the third array linking the selected parent coupon to the selected replacement coupon.

In another aspect, the selected parent coupon and the selected replacement coupon may each be selected based on a counter, and the method may further include, in response to the selected parent coupon matching the selected replacement coupon, incrementing the counter to select the next earliest parent coupon and the next earliest replacement coupon, and selecting the next earliest parent coupon and the next earliest replacement coupon for comparison based on the counter, wherein the counter is incremented each time the selected parent coupon matches the selected replacement coupon.

In another aspect, in response to the selected parent coupon not matching the selected replacement coupon, the method may select the latest parent coupon in the first set, select the latest replacement coupon in the second set, and compare the latest parent coupon to the latest replacement coupon. In response to the latest parent coupon matching the latest replacement coupon, the method may add the third operator to the first array indicating the latest parent coupon does not correspond to the disruption, add the fourth operator to the second array indicating the latest replacement coupon does not correspond to the disruption, and add the second link to the third array linking the latest parent coupon to the latest replacement coupon.

In another aspect, in response to the latest parent coupon not matching the latest replacement coupon, the method may add the fifth operator to the first array indicating the latest parent coupon corresponds to the disruption, add the sixth operator to the second array indicating the latest replacement coupon corresponds to the disruption, and add the third link to the third array linking the latest parent coupon to the latest replacement coupon.

In another aspect, in response to the selected parent coupon matching the selected replacement coupon, the method may determine if both the next earliest parent coupon exists in the first set and the next earliest replacement coupon exists in the second set, and only add the first operator to the first array, the second operator to the second array, and the first link to the third array if both the next earliest parent coupon and the next earliest replacement coupon exist.

In another aspect, in response to at least one of the next earliest parent coupon and the next earliest replacement coupon not existing, if the next earliest parent coupon exists, the method may add, for each parent coupon remaining in the first set, the respective operator to the first array indicating that the respective parent coupon corresponds to the disruption. In response to the at least one of the next earliest parent coupon and the next earliest replacement coupon not existing, if the next earliest replacement coupon exists, the method may also add, for each replacement coupon remaining in the second set, the respective operator to the second array indicating that the respective replacement coupon corresponds to the disruption.

In another aspect, if the next earliest parent coupon exists, the method may include adding, for each parent coupon remaining in the first set, the respective link to the third array linking the parent coupon to the latest replacement coupon in the second set. If the next earliest replacement coupon exists, the method may also include adding, for each replacement coupon remaining in the second set, the respective link to the third array linking the replacement coupon to the latest parent coupon in the first set.

In another aspect, each coupon in the first set of parent coupons may have a status and a departure time, and retrieving the first data defining the first set of parent coupons may comprise filtering each parent coupon for which the status is flown, or for which the departure time is prior to the departure time of another parent coupon having the status flown, from the first set of parent coupons.

In another embodiment, a computer program product for generating the index for information retrieval from the database is provided. The computer program product may include a non-transitory computer-readable storage medium, and program code stored on the medium that, when executed by one or more processors, causes the processors to retrieve, from the first database record, the first data defining the first set of parent coupons that has been exchanged for the second set of replacement coupons due to the disruption which impacted one or more of the parent coupons, and retrieve, from the second database record, the second data defining the second set of replacement coupons. The program code may further case the processors to define the first array of operators each corresponding to the respective one of the parent coupons in the first set of parent coupons and indicating if the respective parent coupon corresponds to the disruption, define the second array of operators each corresponding to the respective one of the replacement coupons in the second set of replacement coupons and indicating if the respective replacement coupon corresponds to the disruption, and define the third array of links each linking at least one parent coupon in the first set to at least one replacement coupon of the second set. The program code may further cause the processors to store the first array, the second array, and the third array in the index.

In another embodiment, a system is provided that includes one or more processors and a memory coupled to the processors. The memory may store program code that, when executed by at least one of the processors, causes the system to retrieve, from a first database record, first data defining a first set of first coupons, and retrieve, from a second database record, second data defining a second set of segments. The program code may further cause the system to, for each segment in the second set, generate a second coupon corresponding to the segment, and identify each first coupon for which the second coupon is a replacement. The program code may further cause the system to, for each first coupon identified, create an array that includes a first coupon element that identifies the first coupon and a second coupon element that identifies the second coupon and is linked to the first coupon element. The program code may further cause the system to add the array to a first index.

In another aspect, the program code may further cause the system to, for each array in the first index, determine if the first coupon was impacted by a disruption, and, if the first coupon was impacted by the disruption, flag the first coupon as corresponding to the disruption.

In another aspect, the first index may be generated in response to receiving a first request to exchange a first ticket for a second ticket, and stored in a third database record. In response to receiving a request to display the second ticket, the program code may cause the system to retrieve the first index from the third database record, and, for each array in the first index, retrieve third data that defines the second coupon, retrieve fourth data that defines the first coupon linked to the second coupon, and retrieve fifth data that identifies whether the first coupon linked to the second coupon is flagged as corresponding to the disruption. The program code may further cause the system to use the third data, the fourth data, and the fifth data to transmit a reply to the request, the reply being configured to cause the requesting system to display, for each second coupon defined by the third data, sixth data that defines the second coupon, the first coupon that is linked the second coupon, and whether the first coupon corresponds to the disruption.

In another aspect, the program code may further cause the system to determine if the requesting system is compatible with a portion of the sixth data which defines the first coupon that is linked the second coupon, and if the requesting system is not compatible, filter the portion of the sixth data from the reply.

In another aspect, the first index may be stored in a third database record, and the program code may further cause the system to, for each first coupon in the first set, extract, from the first database record, a fare component of the first coupon, store the fare component in a fare element, store third data identifying the first coupon and the first database record in a product element, link the fare element and the product element to define a data structure, and add the data structure to a second index. The program code may further cause the system to store the second index in the third database record.

In another aspect, the first database record may include an original ticket, the second database record may include a reservation record, the first index may include a disruption index, and the second index may include a fare structure index.

In another aspect, the first index may be generated in response to receiving a first request to exchange a first ticket for a second ticket, and the program code may further cause the system to, in response to receiving a second request to exchange the second ticket for a third ticket, retrieve, from the second database record, third data defining a third set of segments. The program code may further cause the system to, for each segment in the third set of segments, generate a third coupon corresponding to the segment, and identify each second coupon for which the third coupon is the replacement. For each second coupon identified, the program code may cause the system to identify each array corresponding to the second coupon, add a third coupon element that identifies the third coupon to the identified array, and link the third coupon element to the second coupon element. The first index may thereby be configured to provide a mapping between each third coupon and at least one corresponding first coupon.

In another aspect, the program code may further cause the system to, for each first data structure in the first index, determine if the second coupon was impacted by a disruption, and if the second coupon was impacted by the disruption, flag the second coupon as disrupted.

In another aspect, the program code may further cause the system to, for each second coupon, determine if the second coupon is being replaced by more than one third coupon. If the second coupon is being replaced by more than one third coupon, the program code may cause the system to identify each array that includes the second coupon element corresponding to the second coupon, and for each array identified, generate duplicates of the identified array so that a corresponding array exists to accept the third coupon element for each third coupon replacing the second coupon.

In another embodiment, a method of indexing database records for information retrieval is provided. The method may include retrieving, from the first database record, the first data defining the first set of first coupons, and retrieving, from the second database record, the second data defining the second set of segments. The method may further include, for each segment in the second set, generating the second coupon corresponding to the segment, and identifying each first coupon for which the second coupon is the replacement. For each first coupon identified, the method may create the array that includes the first coupon element that identifies the first coupon and the second coupon element that identifies the second coupon and is linked to the first coupon element. The method may further add the array to the first index.

In another aspect, the method may further include, for each array in the first index, determining if the first coupon was impacted by the disruption, and if the first coupon was impacted by the disruption, flagging the first coupon as corresponding to the disruption.

In another aspect, the first index may be generated in response to receiving the first request to exchange the first ticket for the second ticket and stored in the third database record, and the method may further include receiving the request to display the second ticket. In response to receiving the request, the method may retrieve the first index from the third database record. For each array in the first index, the method may retrieve third data that defines the second coupon, retrieve fourth data that defines the first coupon linked to the second coupon, and retrieve fifth data that identifies whether the first coupon linked to the second coupon is flagged as corresponding to the disruption. The method may further include using the third data, the fourth data, and the fifth data to transmit the reply to the request, the reply being configured to cause the requesting system to display, for each second coupon defined by the third data, the sixth data that defines the second coupon, the first coupon that is linked the second coupon, and whether the first coupon corresponds to the disruption.

In another aspect, the method may further include determining if the requesting system is compatible with the portion of the sixth data which defines the first coupon that is linked the second coupon, and if the requesting system is not compatible, filtering the portion of the sixth data from the reply.

In another aspect, whether the requesting system is compatible with the portion of the sixth data may be determined based on an identity of the requesting system, or the status of the flag in the request.

In another aspect, the first index may be stored in the third database record, and for each first coupon in the first set, the method may further include extracting the fare component of the first coupon from the first database record, storing the fare component in the fare element, storing the third data identifying the first coupon and the first database record in the product element, linking the fare element and the product element to define the data structure, and adding the data structure to the second index. The method may then store the second index in the third database record.

In another aspect, the first index may be generated in response to receiving the first request to exchange the first ticket for the second ticket, and the method may further include, in response to receiving the second request to exchange the second ticket for the third ticket, retrieving, from the second database record, third data defining the third set of segments. For each segment in the third set of segments, the method may generate the third coupon corresponding to the segment, and identify each second coupon for which the third coupon is the replacement. For each second coupon identified, the method may identify each array corresponding to the second coupon, add the third coupon element that identifies the third coupon to the identified array, and link the third coupon element to the second coupon element. The first index may thereby be configured to provide the mapping between each third coupon and the at least one corresponding first coupon.

In another aspect, the method may further include, for each first data structure in the first index, determining if the second coupon was impacted by the disruption, and, if the second coupon was impacted by the disruption, flagging the second coupon as disrupted.

In another aspect, the method may further include, for each second coupon, determining if the second coupon is being replaced by more than one third coupon. If the second coupon is being replaced by more than one third coupon, the method may identify each array that includes the second coupon element corresponding to the second coupon, and, for each array identified, generate duplicates of the identified array so that the corresponding array exists to accept the third coupon element for each third coupon replacing the second coupon.

In another embodiment, a computer program product for processing database records is provided. The computer program product may include a non-transitory computer-readable storage medium, and program code stored on the medium that, when executed by one or more processors, causes the processors to retrieve, from the first database record, the first data defining the first set of first coupons, and retrieve, from the second database record, the second data defining the second set of segments. The program code may further cause the processors to, for each segment in the second set, generate the second coupon corresponding to the segment, and identify each first coupon for which the second coupon is the replacement. The program code may further cause the processors to, for each first coupon identified, create the array that includes the first coupon element that identifies the first coupon and the second coupon element that identifies the second coupon and is linked to the first coupon element. The program code may further cause the processors to add the array to the first index.

The above summary may present a simplified overview of some embodiments of the invention in order to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 3 is a diagrammatic view of an image of a reservation record that may be stored in the reservation database of FIG. 1.

FIG. 4 is a diagrammatic view of an image of an original ticket that may be stored in the ticket database of FIG. 1.

FIG. 5 is a diagrammatic view of the image of the reservation record of FIG. 3 with an updated itinerary.

FIG. 6 is a diagrammatic view of the image of the original ticket of FIG. 4 and an image of a reissue ticket that may have issued in response to executing a partial reissue of tickets in accordance with the updated itinerary defined by the reservation record of FIG. 5.

FIG. 7 is a diagrammatic view of the image of the original ticket of FIG. 4, and an image of a reissue ticket that may have issued in response to executing a full reissue of tickets in accordance with the updated itinerary defined by the reservation record of FIG. 5.

FIGS. 14-18 are diagrammatic views of exemplary sets of coupons that demonstrate the process of FIGS. 10-13 as applied to a number of different ticket exchange scenarios.

FIG. 20 is a diagrammatic view of an image of an updated version of the reservation record of FIG. 5, and a number of images of tickets that may have been issued based on the updated reservation record.

FIG. 22 is a diagrammatic view of enriched images of an exemplary parent and an exemplary reissue ticket that may be displayed by the user system of FIG. 1.

FIG. 23 is a diagrammatic view of an enriched image of an exemplary reissue ticket issued in response to an exchange of the reissue ticket in FIG. 22.

FIG. 24 is a diagrammatic view of an exemplary masked version of the enriched image of FIG. 23.

FIG. 25 is a diagrammatic view of an image of an exemplary original ticket.

FIG. 26 is a diagrammatic view of an image of the original ticket of FIG. 25 and an image of an exemplary reissue ticket after an exchange of the original ticket for the reissue ticket.

FIG. 27 is a diagrammatic view of images of the original ticket and the reissue ticket of FIG. 26, and an image of an exemplary reissue ticket issued in exchange for the earlier reissue ticket.

FIGS. 31 and 32 are diagrammatic views of files that may cause the database management system of FIG. 29 to implement a portion of the process of FIG. 30.

DETAILED DESCRIPTION

Embodiments of the invention may be implemented by a data processing system that provides processing and database functions which enable interconnections between a plurality of database systems. Embodiments of the invention may include a database management system that provides an interface between a user system, a provider system, and the database systems. The database management system may include an exchange server that generates a transitional record. The transitional record may store data used to manage updates to ticket and reservation database records caused by requests to exchange a ticket from the user system. The transitional record may include a fare structure index and a disruption index that provides a mapping function between records in the reservation and ticket databases. This mapping function may increase the speed and efficiency with which the exchange server processes database records in response to receiving a request to exchange a ticket.

Figure 1:
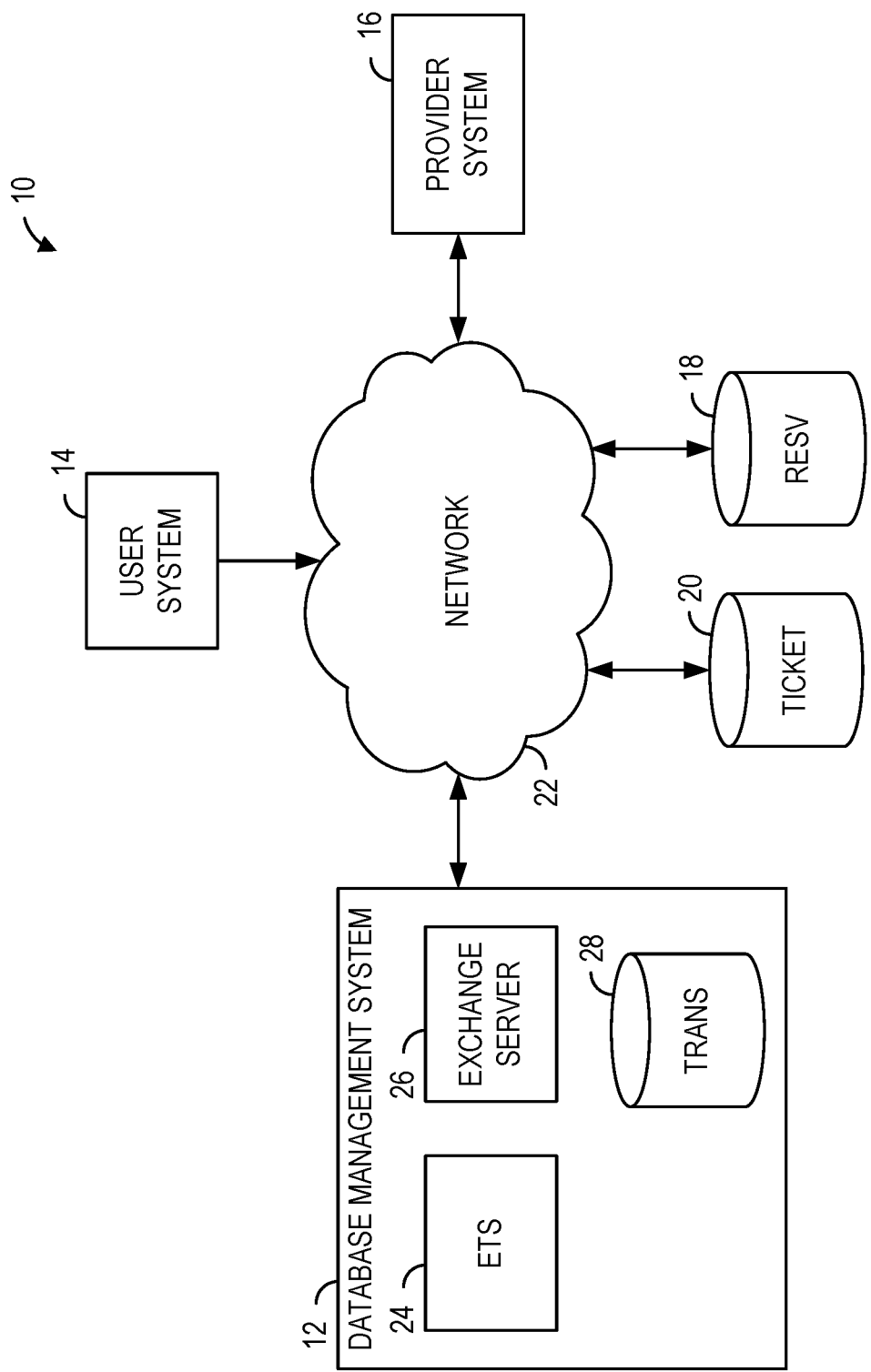
FIG. 1 is a diagrammatic view of an exemplary operating environment including a database management system in communication with a user system, a provider system, a reservation database, and a ticket database.

Referring now to FIG. 1, an operating environment 10 in accordance with an embodiment of the invention may include a database management system 12, a user system 14, a provider system 16, a reservation database 18, and a ticket database 20. Each of the database management system 12, user system 14, provider system 16, reservation database 18, and ticket database 20 may communicate through a network 22. The network 22 may include one or more private or public data networks (e.g., the Internet) that enable the exchange of data between systems connected to the network 22.

The database management system 12 may include an Electronic Ticketing Server (ETS) 24, an exchange server 26, and a transitional record database 28. The database management system 12 may be configured to receive and process queries from the user system 14 and/or provider system 16. The database management system 12 may receive and process queries such as search queries, informative pricing queries, confirmed pricing queries, ticket issue requests, ticket reissue/exchange requests, or any other query associated with searching for, pricing, booking, and ticketing of travel products. In response to receiving a query, the database management system 12 may communicate with one or more of the user system 14, provider system 16, reservation database 18, ticket database 20, or other suitable system to process the query. In an embodiment, the database management system 12 may comprise a Global Distribution System (GDS).

The user system 14 may be a travel agency system, airline reservation system, travel web site system, or any other system used to search for, reserve, purchase, and/or exchange travel products. Queries transmitted to the database management system 12 by the user system 14 may include data defining an origin, a destination, a number of spaces to be reserved, a period of time during which travel is desired, a specific flight, or any other information relevant to the purpose of the query.

The provider system 16 may include a Computer Reservation System (CRS) that enables the database management system 12 to reserve and pay for travel products, such as airline tickets. For providers of air travel, the CRS may manage reservations for spaces between nodes of a travel network. Each node of the travel network may comprise a station (e.g., an airport) to and from which the provider operates flights. The provider system 16 may also interact with other provider systems, either directly or through the database management system 12, to enable a validating carrier to sell tickets for spaces provided by the operating carrier. The operating carrier may then bill the validating carrier for the products provided.

In response to the user system 14 transmitting a request to reserve a travel product, such as a flight, the database management system 12 may generate a new reservation record and/or modify an existing reservation record in the reservation database 18. The reservation record may include one or more data elements, or "elements" that contain data which defines itinerary and traveler information associated with one or more reserved travel products. The itinerary may include travel products from multiple travel product providers. In the context of air travel, the itinerary may include a set of segments comprising one or more flights between an origin and a destination. To facilitate locating the reservation record in the reservation database 18, a record locator or other suitable identifier may be associated with the reservation record. In an embodiment, the reservation record may comprise a Passenger Name Record (PNR) stored in a PNR database.

The reservation record may include elements that identify segments on which space has been reserved. A space may be distinguished from a seat based on the concept of overbooking. Overbooking refers to the practice by which providers book more spaces than there are physical seats on a flight in anticipation that some booked spaces will go unused due to passengers failing to show up at the time of departure. A segment may refer to the operation of an aircraft between a point where passengers first board the aircraft and a point where the passengers exit the aircraft for a final time. A segment may include any number of stops where passengers can exit and re-board the same aircraft. A flight may refer to the operation of one or more segments with the same flight designator, and may involve more than one aircraft. To book a flight that includes multiple segments, multiple elements each defining a segment of the flight may be created in the reservation record.

Reserving a travel product may include checking the provider inventory for availability of the product, e.g., available space on the segments comprising the itinerary. This check may include sending a reservation request from the user system 14 to the database management system 12. The database management system 12 may in turn query a corresponding provider system 16 for availability of the products requested. If the requested products are available, the products may be reserved, and the provider inventory decreased to reflect the reservation.

The ETS 24 may be configured to manage records in the ticket database 20 which relate to the issuance, modification, and use of tickets. Each ticket may comprise a database record that defines flight information such as a validating carrier, an operating carrier, a flight number, an origin for the flight, a destination for the flight, a booking class, flight dates, and a price paid for the ticket. The ticket record may also include a timestamp that indicates when the ticket was "issued", e.g., added to or committed in the ticket database 20. Tickets may be issued by the ETS 24 in response to receiving an indication that an associated reservation record has been confirmed. The ETS 24 may populate elements in the ticket based on data stored in the reservation record. This information may include details for each segment defined in the reservation record, such as booking class, date of departure, boarding point, deplaning point, an identity of the passenger, one or more forms of payment used to purchase the segment, etc.

The ticket may include elements that define a "coupon". For a given itinerary, one or more tickets may be issued to a passenger that include coupons for each segment of the itinerary. Each coupon may identify a specific segment for which the ticket can be used to obtain a boarding pass. The status of a coupon may be "open" if the coupon is unused, "flown" if the coupon has been used, or "exchanged" if the coupon has been exchanged for another flight.

Each ticket in the ticket database 20 may have a unique identifier, or ticket number, which may be stored in an element of the ticket. To retrieve data stored in the ticket, a ticket display query may be transmitted to the ticket database 20. In response to receiving the display query, the ticket database 20 may return data from the database record matching a ticket number in the query.

Tickets may include additional coupons that can be used to obtain products other than boarding passes. The ticket database 20 may also store other types of electronic documents, such as Electronic Miscellaneous Documents (EMDs), that represent a payment for chargeable services which have been purchased by the traveler. These chargeable services may be represented in the reservation record using Special Service Requests (SSRs). Services that are chargeable may be associated to an EMD and/or coupon number in the reservation record.

Figure 2:
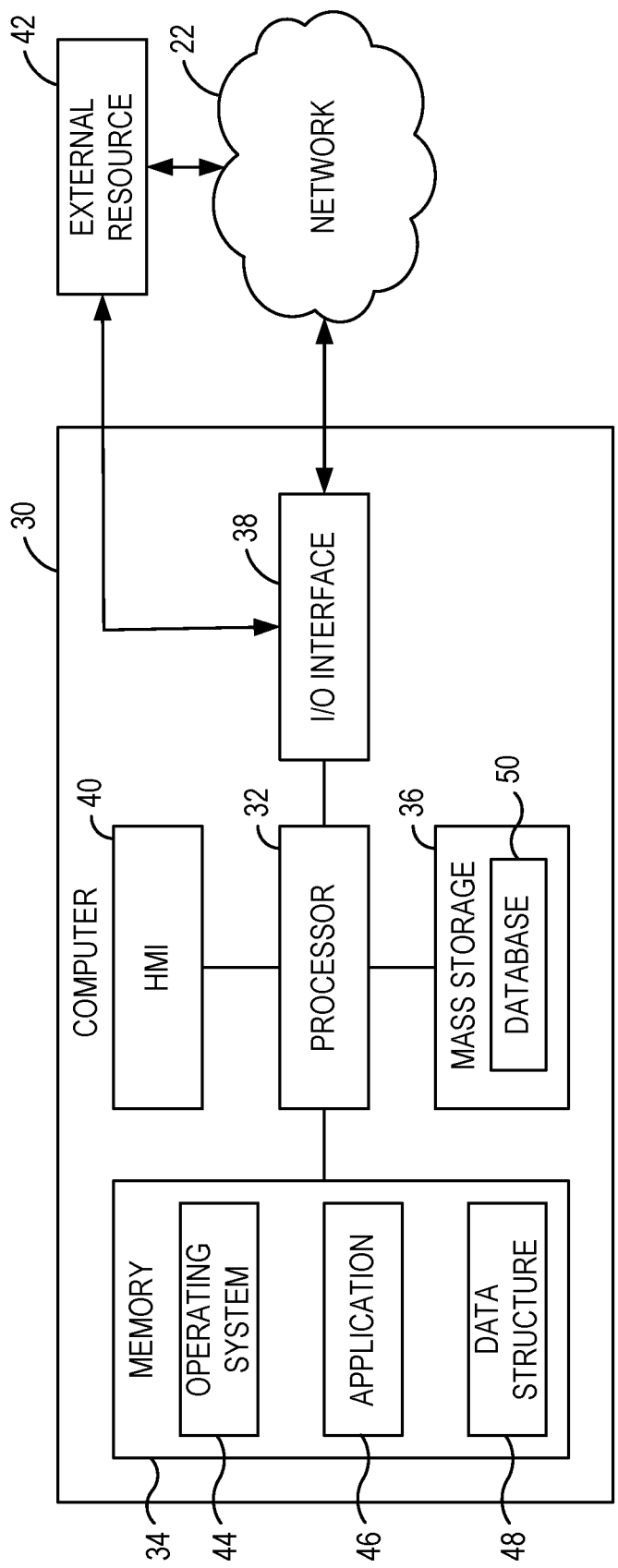
FIG. 2 is a diagrammatic view of an exemplary computer that may be used to provide the operating environment of FIG. 1.

Referring now to FIG. 2, the database management system 12, user system 14, provider system 16, reservation database 18, and ticket database 20 of operating environment 10 may be implemented on one or more computer devices or systems, such as exemplary computer 30. The computer 30 may include a processor 32, a memory 34, a mass storage memory device 36, an input/output (I/O) interface 38, and a Human Machine Interface (HMI) 40. The computer 30 may also be operatively coupled to one or more external resources 42 via the network 22 and/or I/O interface 38. External resources may include, but are not limited to, servers, databases, mass storage devices, peripheral devices, cloud-based network services, or any other suitable computer resource that may be used by the computer 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing data. The mass storage memory device 36 may include data storage devices such as a hard drive, optical drive, tape drive, volatile or non-volatile solid state device, or any other device capable of storing data.

The processor 32 may operate under the control of an operating system 44 that resides in memory 34. The operating system 44 may manage computer resources so that computer program code embodied as one or more computer software applications, such as an application 46 residing in memory 34, may have instructions executed by the processor 32. The processor 32 may also execute the application 46 directly, in which case the operating system 44 may be omitted. The one or more computer software applications may include a running instance of an application comprising a server, which may accept requests from, and provide replies to, one or more corresponding client applications. One or more data structures 48 may also reside in memory 34, and may be used by the processor 32, operating system 44, and/or application 46 to store and/or manipulate data.

The I/O interface 38 may provide a machine interface that operatively couples the processor 32 to other devices and systems, such as the network 22 or external resource 42. The application 46 may thereby work cooperatively with the network 22 and/or external resource 42 by communicating via the I/O interface 38 to provide the various features, functions, applications, processes, and/or modules comprising embodiments of the invention. The application 46 may also have program code that is executed by one or more external resources 42, and/or otherwise rely on functions and/or signals provided by other system and/or network components external to the computer 30. Indeed, given the nearly endless hardware and software configurations possible, it should be understood that embodiments of the invention may include applications that are located externally to the computer 30, distributed among multiple computers and/or other external resources 42, and/or provided by computing resources (hardware and software) that are provided as a service over the network 22, such as a cloud computing service.

The HMI 40 may be operatively coupled to the processor 32 of computer 30 to enable a user to interact directly with the computer 30. The HMI 40 may include video and/or alphanumeric displays, a touch screen, a speaker, and any other suitable audio and visual indicators capable of providing data to the user. The HMI 40 may also include input devices and controls such as an alphanumeric keyboard, a pointing device, keypads, pushbuttons, control knobs, microphones, etc., capable of accepting commands and/or input from the user and transmitting the entered input to the processor 32.

A database 50 may reside on the mass storage memory device 36, and may be used to collect and organize data used by the various systems and modules described herein. The database 50 may include data and supporting data structures that store and organize the data. In particular, the database 50 may be arranged with any database organization and/or structure including, but not limited to, a relational database, a hierarchical database, a network database, an object-oriented database, or combinations thereof.

A database management system in the form of a computer software application executing as instructions on the processor 32 may be used to access data stored in records of the database 50 in response to a query, where the query may be dynamically determined and executed by the operating system 44, other applications 46, and/or one or more modules. Although embodiments of the invention may be described herein using relational, hierarchical, network, object-oriented, or other database terminology in specific instances, it should be understood that embodiments of the invention may use any suitable database management model, and are not limited to any particular type of database.

FIG. 3 depicts an image 60 of an exemplary a reservation record for a flight from Nice France to John F. Kennedy Airport in New York that connects through Charles de Gaulle airport in Paris. The reservation record includes a identifier field 62 that stores a record identifier, a passenger name field 64, and number of segment fields 65, 66. The record identifier may be an alpha numeric string (e.g., 89DRGH) that uniquely identifies the reservation record within the reservation database 18. The passenger name field may store the name of the passenger (e.g., "John Smith"). If more than one passenger is traveling on the itinerary defined by the reservation record, more than one passenger may be listed in the reservation record. Each segment field 65, 66 may include a flight identifier (e.g., AF7711) and a class code (e.g., "Y" indicating economy class). The flight identifier may include a carrier identifier (e.g., AF=Air France) and flight number (e.g., 7711). Each segment field may also include data that defines a date of travel, (e.g., 19MAR), origin and destination points (e.g., NCECDG), and scheduled departure and arrival times for the segment (e.g., depart at 7:10, arrive at 8:45).

Once the travel products comprising the itinerary have been reserved, the traveler may commit to the itinerary by purchasing one or more tickets for the travel products. Purchasing a ticket may involve pricing, booking, and ticketing. In response to receiving a request from the user system 14, the database management system 12 may price the ticket with the help of the fare engine. The fare engine may determine a total fare for the ticket by calculating a fare for each of the one or more segments of the itinerary defined by the reservation record, and summing these fares to generate the total fare. The resulting ticket may include one or more coupons, with each coupon corresponding to one of the segments or services included in the trip.

The itinerary of the ticket may define the segments for which the ticket can be used to obtain a boarding pass, and other services that comprise the trip. Each segment of the itinerary may include one or more sequential legs each connecting a scheduled departure station to a scheduled arrival station.

Once availability has been confirmed, and the itinerary priced, the traveler may be asked to approve the transaction. In response to the traveler approving the transaction, the database management system 12 or other reservation system may commit to the reservation record, transmit a request to the ETS 24 to generate tickets for the travel products, and cause the traveler's account to be billed for the price of the services.

FIG. 4 depicts an image 70 of an exemplary ticket database record, or "ticket", that may be created in response to booking the reservation record 89DRGH in image 60. The ticket may include a ticket number field 72 that contains data which uniquely identifies the ticket (e.g., TKT-001), a record locator field 74 that contains data identifying the reservation record from which the ticket was generated, a passenger name field 76, a number of coupon fields 78, 79, and a number of fare component fields 82, 83. In exemplary ticket TKT-001, coupon C1 may correspond to segment S1 of reservation record 89DRGH, and coupon C2 may correspond to segment S2 of reservation record 89DRGH.

Each coupon may include data defining the flight number, booking class code, departure date and time, origination code, destination code, and a flight status. In exemplary ticket TKT-001, the flight status is shown as "O", or "open", indicating that the coupons have not been used. Other segment statuses may include "F" or "flown", and "E" or "exchanged". The ticket may also include one or more fare component fields 82, 83. In ticket TKT-001, the fare component fields 82, 83 are shown below the coupon fields 78, 79, and correspond to fares FC1 and FC2 calculated for segments S1 and S2 of reservation record 89DRGH.

In some cases, a traveler may be subject to an involuntary change in their itinerary due to the occurrence of a disruption. A disruption may occur if, for example, a flight is canceled due to weather or a mechanical problem, a connecting segment is missed due to the late arrival of an earlier segment, a schedule is changed, or a last minute problem occurs at the airport. Involuntary changes to the itinerary may be handled by a full exchange of the ticket, or by a partial exchange. In the case of a partial exchange, there may be two co-existing live tickets in the ticket database that each provide a part of the traveler's total itinerary. In either case, a new itinerary may be defined in the reservation record that replaces disrupted segments. A reissue ticket may then be generated based on the updated reservation record.

By way of an example using the reservation record 89DRGH depicted in image 60 and ticket TKT-001 depicted in image 70, in response to the segment from Nice to Paris being disrupted, an agent for the carrier or an automated re-accommodation application may alter the itinerary defined by the reservation record 89DRGH. For example, the reservation record 89DRGH may be modified by substituting a flight that connects through Berlin for the Nice to Paris segment in the reservation record.

FIG. 5 depicts an image 61 of reservation record 89DRGH as it may appear after being modified as described above. The image 61 shows that the previous segment S1 defined in segment field 65 of reservation record 89DRGH has been replaced by two replacement segment fields 67, 68 that define new segments S1 and S2 connecting Nice to Charles de Gaulle via Berlin. The previous segment S2 remains part of the itinerary, and is now designated as segment S3 in segment field 69. A reissue ticket may be issued for the revised itinerary that replaces the exchanged ticket, or a reissue ticket may be issued that replaces only the disrupted segment. In either case, because the change was involuntary, the fare may remain unchanged from the originally booked flight. In conventional reservation systems, this may require that an agent manually set the fare of the replacement segments.

FIG. 6 depicts a scenario in which a reissue TKT-002 is issued in a full exchange for ticket TKT-001. In this scenario, the exchanged or "parent" ticket TKT-001 may appear as shown in ticket image 71, and a reissue ticket TKT-002 may appear as shown in ticket image 90. The reissue ticket may include a ticket number field 92 that contains the new ticket number, a record locator field 94 that contains data identifying the reservation record 89DRGH from which ticket TKT-002 was generated, a passenger name field 96, a number of coupon fields 98-100, and a number of fare component fields 102-104.

The total fare for the replacement coupons C1, C2 identified in coupon fields 98, 99 of the reissue ticket TKT-002 may be set to the same amount (e.g., 80 USD) as the coupon that was replaced (C1 of TKT-001) to maintain the total fare at the originally ticketed price. Because ticket TKT-001 was fully replaced, the status of coupons C1 and C2 in ticket TKT-001 may be "E" for "exchanged" since they have been replaced by coupons C1, C2, and C3 in ticket TKT-002.

FIG. 7 depicts a partial exchange in which ticket TKT-002 is issued for just the new segments. In this case, tickets TKT-001 and TKT-002 may coexist as live tickets in the ticket database 20. As depicted by image 73 of ticket TKT-001 and image 91 of TKT-002, under this alternative scenario, the status of coupon C2 remains open in ticket TKT-001, and TKT-002 only includes coupon fields 98 and 99 and fare component fields 102 and 103.

Because the traveler is typically not charged for changes in their itinerary resulting from a disruption, reissue tickets associated with the disruption may be generated without calculating replacement fares. This may occur, for example, when reissued tickets are issued without charge by the airline in response to a flight disruption due to weather conditions, problems with equipment, flight crew availability, overbooking, delayed connecting flights, etc. Reissuing tickets without calculating replacement fares may enable agents to quickly issue new tickets to disrupted passengers. However, these tickets may be non-standard tickets that lack inherent fare data.

The lack of inherent fare data may create problems when additional transactions involving the reissue ticket are requested after the involuntary exchange. For example, calculations for determining loyalty program points (e.g., accrual of frequent flyer mileage), compensation for canceled flights, and/or refunds or an exchange value of the reissue ticket may be based on the segments that were paid for rather than on the segments which were actually flown or ticketed because of an involuntary exchange. These types of calculations may need both global fare information (e.g., the total price of the ticket) as well information on the structural price of the original ticket at a fare component and/or coupon level.

As a specific example, if a reissue ticket issued as part of an involuntary exchange is later voluntarily exchanged by the traveler, the traveler should normally not be assessed extra charges for the flights that were involuntarily changed.

If the traveler later requests a partial refund of the reissue ticket, determining the residual value of the reissue ticket may require correlating segments in the original and reissue tickets. The reissue ticket may then be used to determine the status of each coupon (e.g., open, flown, or exchanged), and the original ticket may be used to define a monetary value of each segment (e.g., how much was paid and/or the amount of the fare).

Scenarios that can further complicate the determination of structural price information may include a partial exchange of a ticket, which may result in the full itinerary being split between multiple tickets. In some cases, one or more exchanged tickets may have been purged from the system due to the age of the ticket. Because ticket lifetimes may differ, some exchanged tickets relating to a reissued ticket may be available, while others may be missing. For at least these reasons, attempting to determine structural price information by identifying and retrieving each exchanged ticket, and rebuilding the history of exchanges may produce erroneous results.

Compensation for tickets being refunded or exchanged may be determined based on the value of delayed flights. Because coupons for replacement segments issued as a result of an involuntarily exchange are not purchased, the value of these coupons may not necessarily be determined based on either an amount paid for the exchanged segment nor the normal fare for the replacement segment. That is, these segments may have a value that is independent of the normal fares for the exchanged or replacement segments. In some cases, compensation may be linked to the original coupon of the originally purchased ticket. However, it may be difficult or impossible to determine if an exchange of a particular segment was voluntary or involuntary based solely on ticket records. In cases where the entire ticket was exchanged, it may be also difficult to determine that the exchange occurred at all.

Ticket and reservation records may be required to adhere to certain standard formats so that compatibility is maintained between various carrier, travel agency, and GDS systems. Thus, it may not be possible to merely add new types of data to, or otherwise modify, ticket and reservation records in order to address issues caused by involuntary exchanges. To address these problems, embodiments of the invention may employ a transitional record to track old fare component and coupon data. Transitional records may comprise a new type of database record that is used by the exchange server 26 to provide various features of embodiments of the present invention. The exchange server 26 may analyze ticket and reservation records to determine which flights have been disrupted, link segments in the old itinerary to corresponding segments in the new itinerary, and store data defining these disrupted segments and links in the transitional record.

The transactional record may include fare structure data that would have been included in the involuntary tickets if they had been issued as part of a voluntary exchange. The exchange server 26 may also create a hybrid ticket including all coupons in the current itinerary based on data in the transitional record. Fare information from the originally purchased ticket, and links to the coupons of the hybrid ticket, may be stored in the transitional record, and may facilitate determining structural price information for involuntarily exchanged tickets.

The hybrid ticket may enable involuntary tickets to be displayed as if they have been priced and purchased rather than issued as part of an exchange. This may enable follow-up processes to work transparently on involuntarily exchanged tickets by matching previously issued tickets to corresponding reissue tickets. From a given involuntary ticket, embodiments of the invention may cause the user system 14 to display the actual full itinerary, including flown and open segments. This may allow correlations to be made between tickets in the chain of exchanges, which may facilitate later exchanges or refunds of an involuntarily exchanged ticket. For any given coupon of the reissue ticket, the exchange server 26 may find the pricing elements of the coupon, e.g., the original fare component(s) from which the coupon originates. This may enable the exchange server 26 to assign a value to the coupon. Compensation rules may be applied on these fare components, and mileage accrual determined based on the original price.

Figure 8:
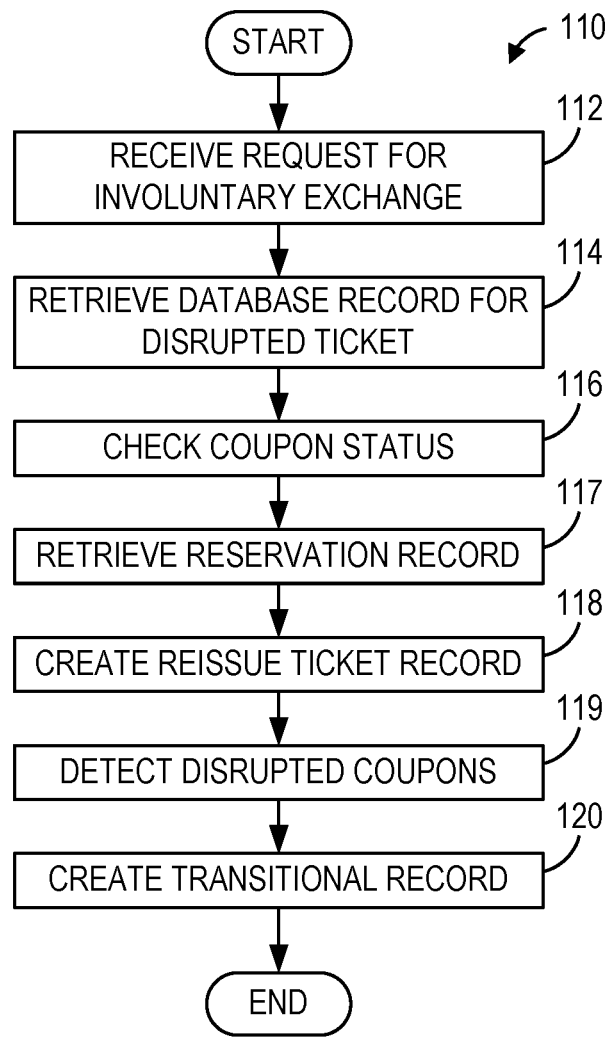
FIG. 8 is a flow chart of a ticket exchange process that may be implemented by the database management system of FIG. 1.

FIG. 8 depicts a flowchart of a ticket exchange process 110 that may be implemented by the exchange server 26 to manage involuntary exchanges. In block 112, the process 110 may receive a request for an involuntary exchange. This request may include the ticket number of the ticket being exchanged and/or the record locator of a reservation record associated with the ticket. In response to receiving the request, the process 110 may proceed to block 114 and retrieve the ticket being exchanged from the ticket database 20. Retrieval of the ticket may include transmitting a query to the ticket database 20 requesting an image of the ticket. This image may include data defining the coupons comprising the ticket and the fare components used to price the ticket, and may be included in a reply transmitted to the exchange server 26 by the ticket database 20. For the exemplary original priced and purchased ticket TKT-001, the ticket database 20 may return image 70 of FIG. 4 to the exchange server 26.

In response to receiving the reply from the ticket database 20, the process 110 may proceed to block 116 and check the status of each coupon in the ticket to determine if the ticket is eligible for an exchange. For example, a ticket for which all the coupons have been flown may be ineligible for an exchange. As can be seen from the coupon fields 78, 79 in image 70, coupons C1 and C2 of TKT-001 are open. Thus, ticket TKT-001 may be eligible for exchange.

Once the status of each coupon of the ticket being exchanged has been determined, the process 110 may proceed to block 117 and retrieve the reservation record identified by the data in the record locator field of the ticket. In the present example, the record locator field 74 of ticket TKT-001 identifies reservation record 89DRGH, which may appear as depicted by image 61 of FIG. 5. The reservation record may define a replacement itinerary that includes one or more replacement segments (e.g., segments S1 and S2) which replace one or more disrupted segments from the previous itinerary.

In response to receiving the image of the reservation record, the process 110 may proceed to block 118 and create a reissue ticket (e.g., ticket TKT-002) in the ticket database 20. The process 110 may also modify the original ticket (e.g., ticket TKT-001) to reflect changes to the status of that ticket. In the present exemplary scenario, the original segment S1 connecting Nice to Paris has been replaced in reservation record 89DRGH with two segments S1 and S2 comprising a flight with a connection in Berlin. For the case of a full exchange, ticket TKT-002 as depicted by image 90 of FIG. 6 may be created in the ticket database 20. Because the ticket TKT-002 depicted in image 90 is a full replacement for ticket TKT-001 as depicted in image 70, TKT-001 may be modified by changing the status of the coupons to "exchanged", as shown in image 71.

Once the tickets involved in the exchange have been created and/or modified, the process 110 may proceed to block 119. In block 119, the process 110 may determine which coupons in each of the parent ticket and the reissue ticket are associated with the disruption. Once the disrupted coupons have been identified, the process 110 may proceed to block 120, and create a transitional record that stores data relating to the ticket exchange. As is described below, the transitional record may improve the speed and efficiency of future data retrieval operations involving an exchange of the reissue ticket.

The process of determining which coupons correspond to the disruption and creating the transitional record linking these coupons may begin by identifying one or more coupons in the parent ticket that were involved in the exchange. A coupon in the parent ticket may be considered as matching a coupon in the reissue ticket if the coupons being compared have the same flight information. Flight information may include the identities of the validating and operating carriers, flight number, departure and arrival locations, booking and/or cabin class, and/or flight dates for departure and arrival, for example.

Figure 9:
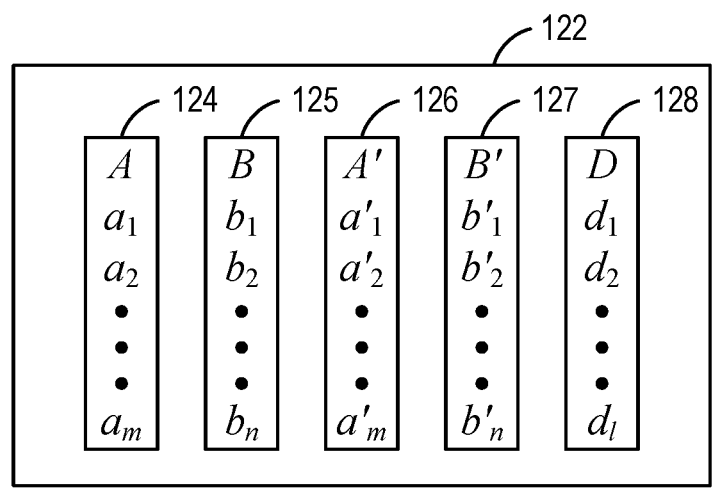
FIG. 9 is a diagrammatic view of an exchange index that may be used by the process of FIG. 8 to perform the ticket exchange.

FIG. 9 depicts an exemplary exchange index 122 that includes several arrays or "sets" 124-128. These sets may be used by the exchange server 26 to identify disrupted coupons in the parent and reissue tickets, and link coupons in the parent ticket with corresponding replacement coupons in the reissue ticket. The sets 124-128 may include a set A of one or more parent coupons $a_g$ that are open (and thus exchangeable) in the parent ticket. For a set A having m coupons, the set may be defined as follows:

$$A = \{a_g\}, g \in [0, m] \quad \text{(Eqn. 1)}$$

In the case of partial exchange, the coupons in set A may be filtered so that only coupons that could be involved in the ticket exchange are analyzed. For example, any coupons that have a flown status may be excluded from analysis. If one or more coupons in the parent ticket have been flown out of sequence (i.e. there is an open coupon with an earlier departure date than a flown coupon), any open coupons having departure dates prior to the departure date of a flown coupon may also be filtered out of set A.

The exchange server 26 may also determine a set B of one or more replacement coupons $b_h$ in the reissue ticket. The set B may include n coupons that collectively provide a solution which replaces the coupons for the disrupted segments in set A. The set B of coupons $b_h$ may be defined as follows:

$$B = \{b_h\}, h \in [0, n] \quad \text{(Eqn. 2)}$$

To document associations with disruptions and links between coupons in each set, the exchange server may populate set A' with m Boolean operators $a'_g$, set B' with n Boolean operators $b'_h$, and set D with l links. For example, set A' may be represented by equation 3, $$A' = \{a'_g\}, g \in [0, m] \quad \text{(Eqn. 3)}$$

where each operator $a'_g$ has a value true (e.g., "1") if coupon $a_g$ corresponds to a disrupted segment, and a value false (e.g., "0") if the coupon $a_g$ does not correspond to a disrupted segment. Similarly, set B' may be represented by equation 4, $$B' = \{b'_h\}, h \in [0, n] \quad \text{(Eqn. 4)}$$

where each operator $b'_h$ has a value true if coupon $b_h$ corresponds to the disruption (i.e., the coupon is replacing a disrupted coupon $a_g$), and a value false if the corresponding coupon $b_h$ does not correspond to the disruption (i.e., the coupon $b_h$ is not replacing a disrupted coupon $a_g$). In an embodiment, the value of each operator $a'_g$ and $b'_h$ may start out as or otherwise initially be set to false. Set D may comprise an array of links that provides an index linking each coupon $a_g$ to one or more coupons $b_h$ which replace the coupon $a_g$.

Set D may comprise a set of l links $d_k$, with each link $d_k$ comprising a data structure that defines a relationship between a parent coupon $a_g$ and a corresponding replacement coupon $b_h$. Each link $d_k$ may be represented as:

$$d_k = (a_g, b_h) \quad \text{(Eqn. 5)}$$

Each parent coupon $a_g$ may be linked to at least one replacement coupon $b_h$. Likewise, each replacement coupon $b_h$ may be linked to at least one parent coupon $a_g$. For example, a disrupted segment may be replaced by more than one segment (e.g., if a direct flight is replaced by a connecting flight), and vice-versa. This may result in m not being equal to n. Thus, the number l of links $d_k$ in the set D may be provided by:

$$l = \max(n, m)$$

since each parent/replacement coupon is linked to at least one replacement/parent coupon. There may not necessarily be a one-to-one correspondence between disrupted segments and replacement segments because a single disrupted segment may be replaced by two replacement segments, or two disrupted segments may be replaced by a single replacement segment.

The process of generating sets A', B' and D may include comparing the earliest parent coupon (i.e., the coupon having the earliest departure time) in set A (e.g., coupon $a_1$) and the earliest replacement coupon in set B (e.g., coupon $b_1$). If the coupons match (i.e., the segment for which each coupon is redeemable appears to be the same segment based on the flight data), the exchange server 26 may compare the next earliest parent coupon in set A to the next earliest replacement coupon in set B, advancing chronologically until finding two coupons that do not match.

In response to identifying a pair of coupons that do not match, the process may select the latest parent coupon (i.e., the coupon having the latest departure time) in set A (e.g., coupon $a_n$), the latest replacement coupon in set B (e.g., coupon $b_m$), and compare these coupons. If the coupons match, the exchange server 26 may compare the next latest coupon in set A to the next latest coupon in set B, advancing in reverse chronological order until finding two coupons that do not match. The exchange server 26 may then determine that all coupons between and inclusive of the earliest non-matching pair of coupons and the latest non-matching pair of coupons are associated with the disruption. That is, the identified coupons correspond to the disrupted coupons $a_g$ in set A, and the corresponding replacement coupons $b_h$ in set B.

Figure 10:
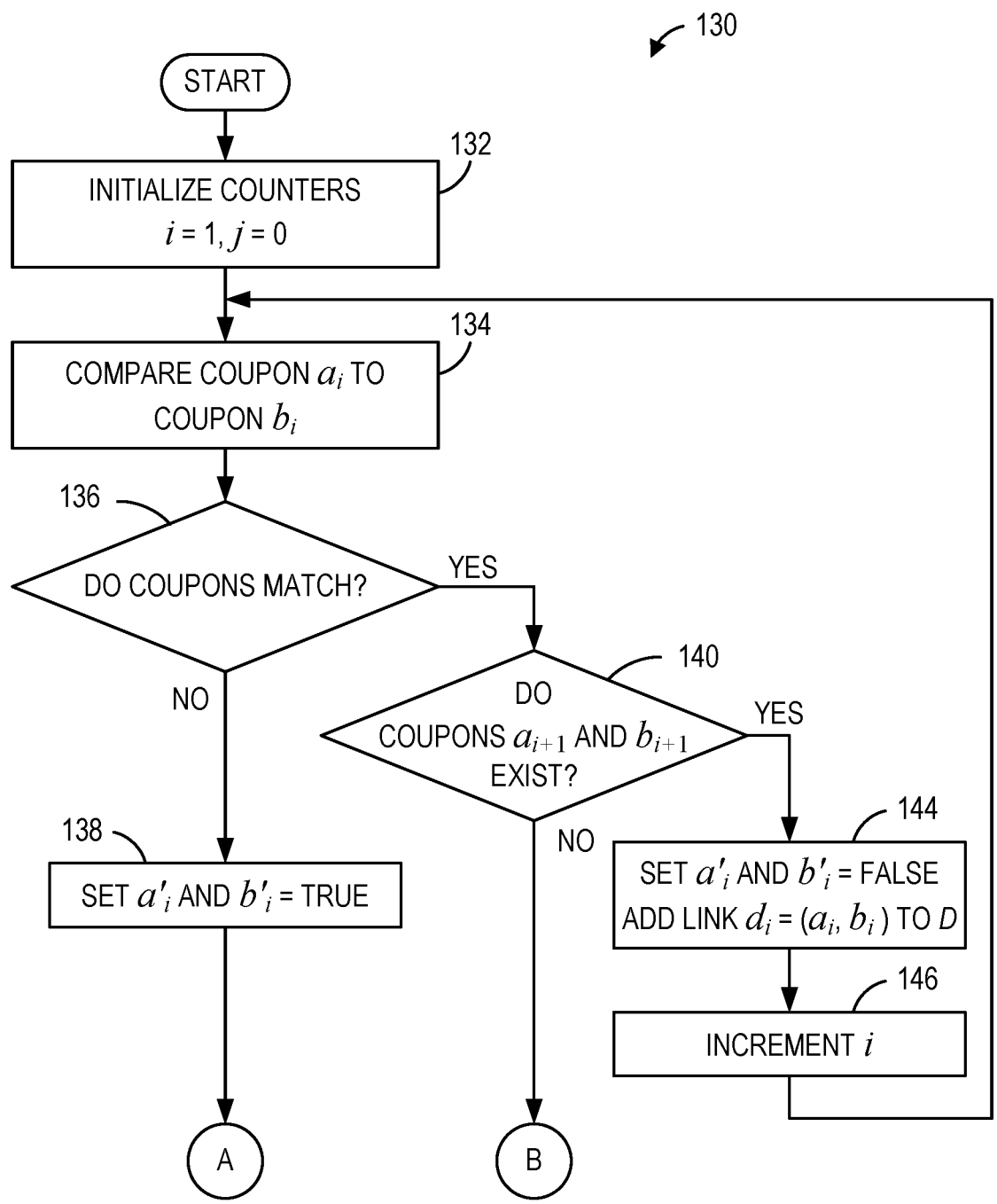
FIGS. 10-13 depict a flow chart of a process for generating the exchange index of FIG. 9.

FIGS. 10-13 present flowcharts depicting a process 130 that may be implemented by the exchange server 26 to detect disrupted coupons, match them to their corresponding replacement coupons, and generate the exchange index. With reference to FIG. 10, in block 132 the process 130 may initialize one or more counters, e.g., by setting counter i=1 and counter j=0. The counters may be used to keep track of which coupons in the sets A and B are being analyzed, as well as the locations of the links $d_k$ being added to set D by the process 130.

Figure 11:
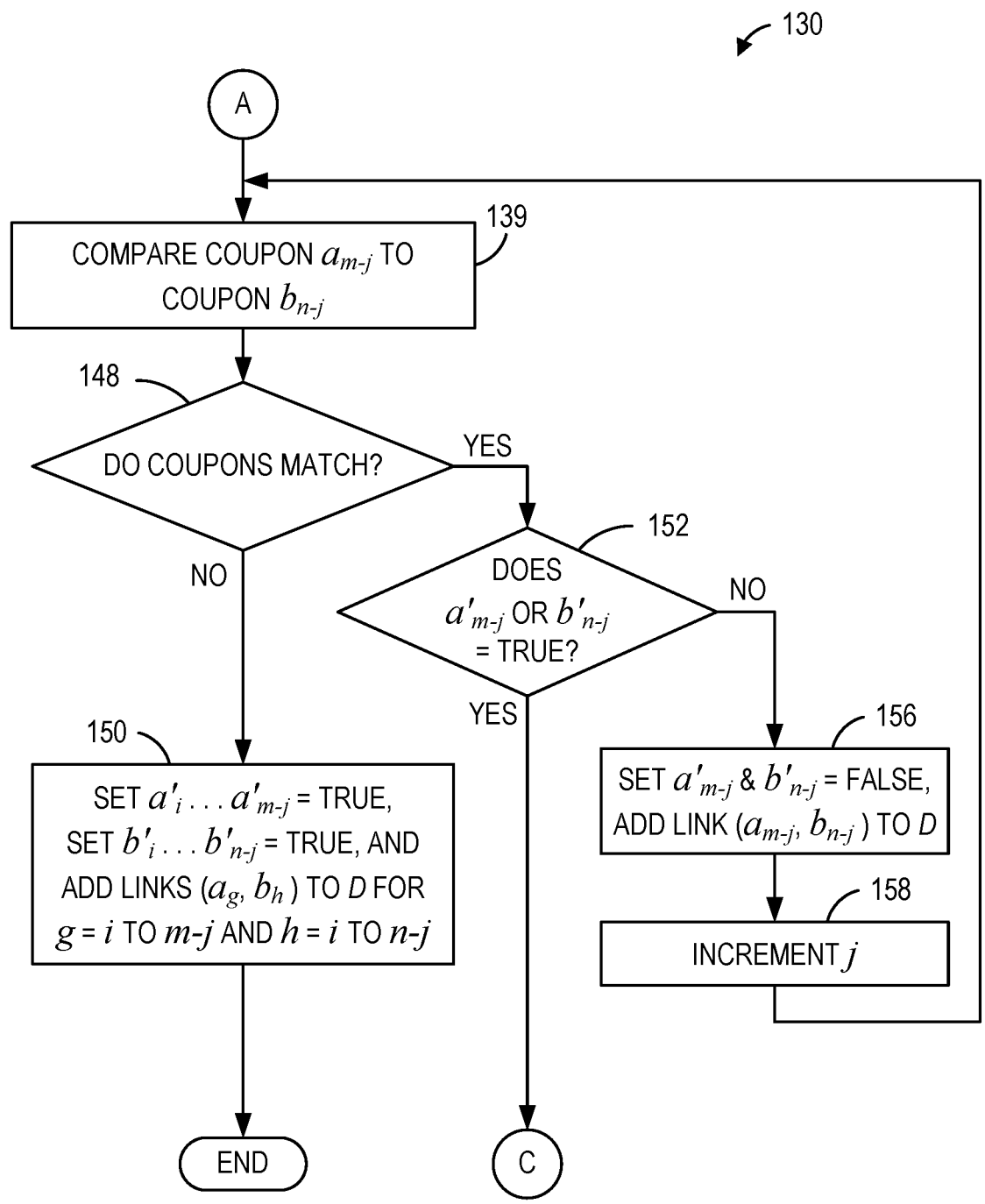

Once the counters are set, the process 130 may proceed to block 134 and compare coupon $a_i$ from set A to coupon $b_j$ from set B. If the coupons do not match ("NO" branch of decision block 136), the process 130 may proceed to block 138, set the values of a'$_i$ and b'$_i$ to true in sets A' and B', thereby indicating the coupons are associated with a disruption, and proceed to block 139 (FIG. 11). If the coupons match ("YES" branch of decision block 136), the process 130 may proceed to block 140.

Figure 12:
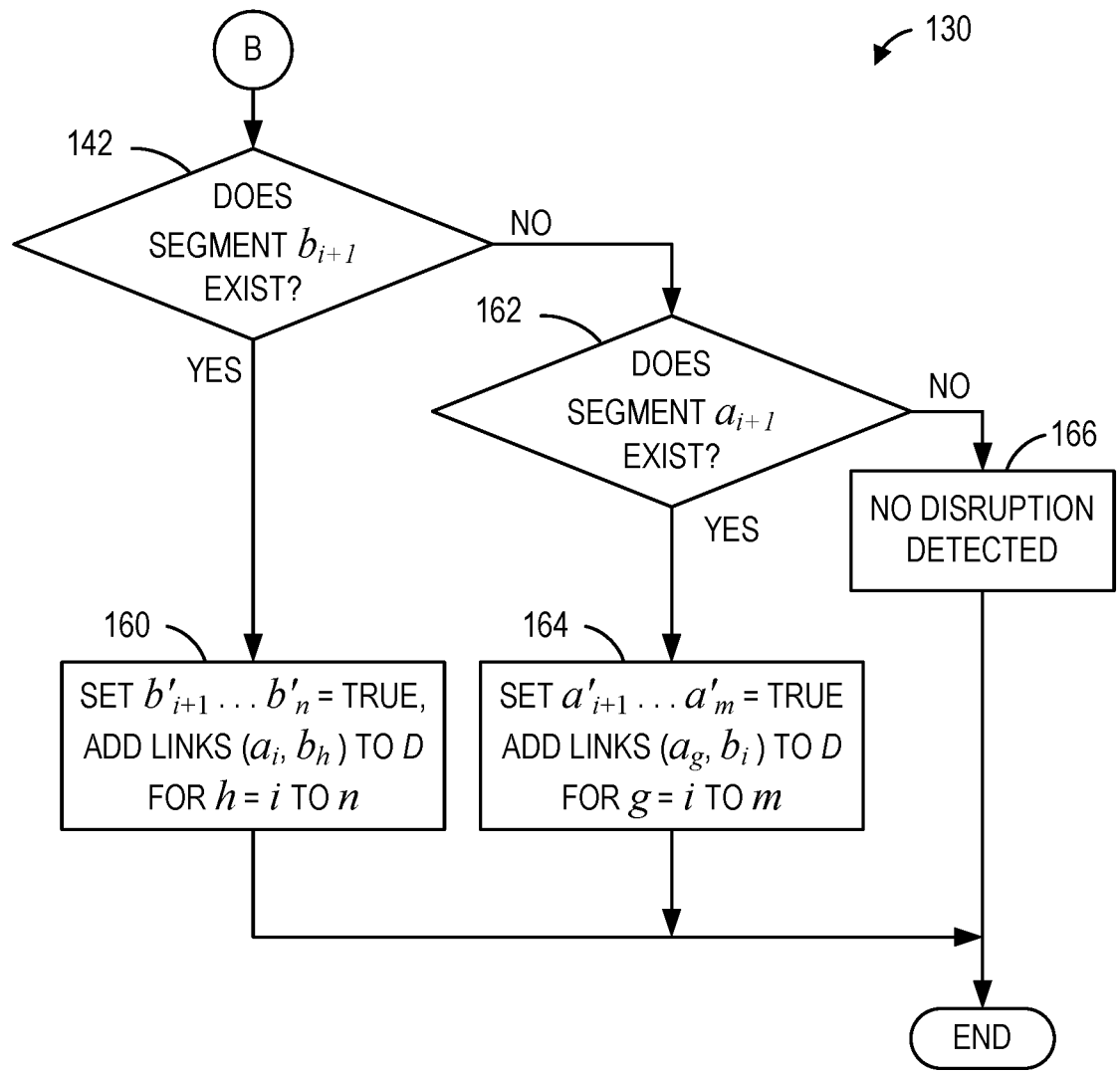

In block 140, the process 130 may determine if both coupon a$_{i+1}$ exists in set A and coupon b$_{i+1}$ exists in set B. If either coupon does not exist in its respective set ("NO" branch of decision block 140), the process 130 may proceed to block 142 (FIG. 12). If both coupons exist in their respective sets ("YES" branch of decision block 140), the process 130 may proceed to block 144.

In block 144, the process 130 may set the values of a'$_i$ and b'$_i$ to false in sets A' and B', respectively, to indicate the coupons are not associated with a disruption, and add a link d$_i$=(a$_i$,b$_i$) to set D. The link d$_i$ may define a relationship between coupon a$_i$ and the coupon b$_i$. The process 130 may then proceed to block 146, increment counter i, return to block 134, and continue the coupon comparison process.

Referring now to FIG. 11, in block 139, the process 130 may compare coupon a$_{m-j}$ to coupon b$_{n-j}$. If the coupons do not match ("NO" branch of decision block 148), the process 130 may proceed to block 150. In block 150, the process 130 may set the values of each operator a'$_i$ through a'$_{m-j}$ in set A', and each operator b'$_i$ through b'$_{m-j}$ in set B' to true. The process 130 may also add links d=(a$_g$, b$_h$) to D for g=i to m-j and h=i to n-j. Once the operators and links have been defined in their respective sets, the process 130 may end.

Figure 13:
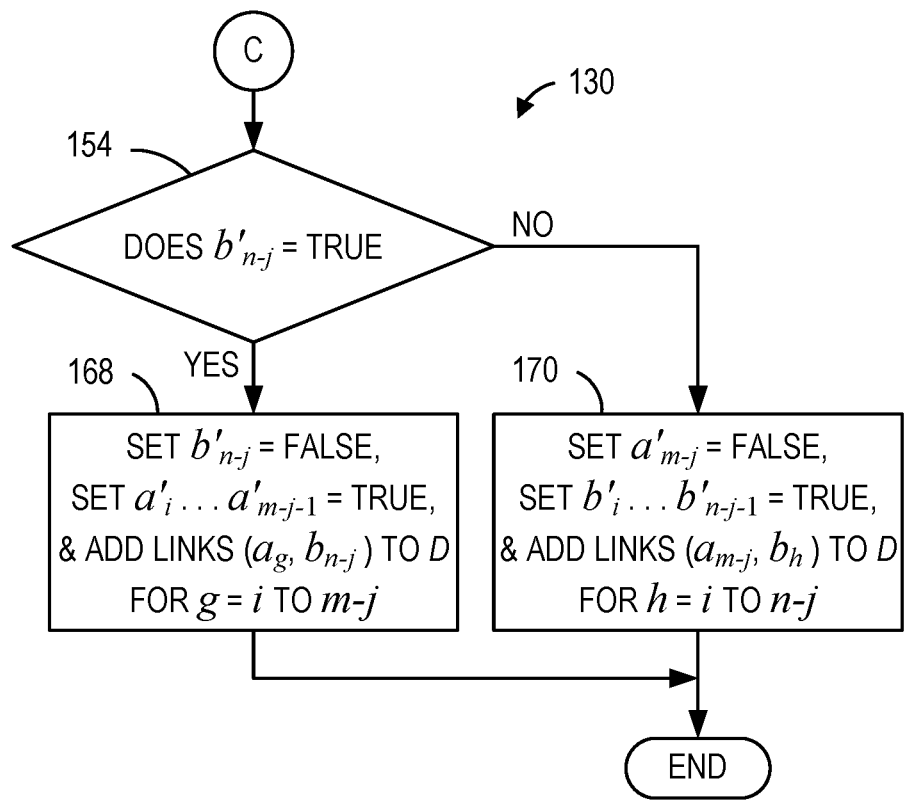

If the coupons match ("YES" branch of decision block 148), the process 130 may proceed to block 152. In block 152, the process 130 may determine if either operator a'$_{m-j}$ or operator b'$_{n-j}$ is true. If either operator is true ("YES" branch of decision block 152), the process 130 may proceed to block 154 (FIG. 13). If neither operator is true ("NO" branch of decision block 152), the process 130 may proceed to block 156.

In block 156, the process 130 may set a'$_{m-j}$ and b'$_{n-j}$=false in sets A' and B', respectively, and add a link d$_{l-j}$=(a$_{m-j}$, b$_{n-j}$) to set D. The link d$_{l-j}$ may define a relationship between coupon a$_{m-j}$ and coupon b$_{n-j}$. The process 130 may then proceed to block 158, increment counter j, return to block 139, and continue the coupon comparison process.

Referring now to FIG. 12, in block 142, the process 130 may determine if coupon b$_{i+1}$ exists in set B. If the coupon exists ("YES" branch of decision block 142), the process 130 may proceed to block 160 and set the values of each operator b'$_{i+1}$ through b'$_n$ in set B' to true. The process 130 may also add links d=(a$_i$,b$_h$) to D for h=i to n. Once the values of operators b'$_{i+1}$ through b'$_n$ have been set and the links d added to set D, the process 130 may end. If the coupon b$_{i+1}$ does not exist in set B ("NO" branch of decision block 142), the process 130 may proceed to block 162.

In block 162, the process 130 may determine if coupon a$_{i+1}$ exists in set A. If the coupon exists ("YES" branch of decision block 162), the process 130 may proceed to block 164. In block 164, the process 130 may set the values of each operator a'$_{i+1}$ through a'$_m$ in set A' to true, and add links d=(a$_g$, b$_i$) to D for g=i to m. Once the values of operators a'$_{i+1}$ through a'$_m$ have been set and the links d added to set D, the process 130 may end. If coupon a$_{i+1}$ does not exist in set A ("NO" branch of decision block 162), the process 130 may proceed to block 166, generate a message indicating that no disrupted coupons were detected, and end.

Referring now to FIG. 13, in block 154, the process 130 may determine if the value of operator b'$_{n-j}$ is true. If the value of operator b'$_{n-j}$ is true ("YES" branch of decision block 154), the process 130 may proceed to block 168, set the value of operator b'$_{n-j}$ in set B' to false, and set the values of each operator a'$_i$ through a'$_{m-j-1}$ in set A' to true. The process 130 may also add links d$_g$=(a$_g$, b$_{n-j}$) to D for g=i to m-j before ending. If the value of operator b'$_{n-j}$ is not true ("NO" branch of decision block 154), the process 130 may proceed to block 170. In block 170, the process 130 may set the value operator a'$_{m-j}$ in set A' to false, and set the values of each operator b'$_i$ through b'$_{n-j-1}$ in set B' to true. The process 130 may also add links d$_h$=(a$_{m-j}$, b$_h$) to D for h=i to n-j before ending.

FIG. 14 depicts an application of the above described process 130 to an exemplary set 180 of coupons 182-185 (e.g., set A of coupons a$_1$-a$_4$) from a parent ticket, and an exemplary set 190 of coupons 192-195 (e.g., set B of coupons b$_1$-b$_4$) from a reissue ticket. The exchange server 26 may begin the analysis by initializing counter i=1 and counter j=0, and selecting the earliest coupon in chronological order from each of set A and set B (e.g., coupon a$_1$ and coupon b$_1$) based on the value of counter i.

The exchange server 26 may compare the selected coupons a$_1$ and b$_1$ (as indicated by double arrowed line 200) to determine if they have the same flight information. In response to determining that the coupons do have the same flight information (i.e., that a$_1$=b$_1$), the exchange server 26 may next determine if both coupon a$_2$ exists in set A, and coupon b$_2$ exists in set B. In response to determining these coupons do exist in each of their respective sets, the exchange server 26 may set (or verify, as the case may be) the value of operator a'$_1$ of set A' and operator b'$_2$ of set B' equal to false (thereby indicating they are not associated with a disrupted link), add a link d$_1$=(a$_1$, b$_1$) to set D, and increment counter i to 2.

The exchange server 26 may then compare coupon a$_2$ of set A to coupon b$_2$ from set B (as indicated by double arrowed line 202), which are the next coupons in chronological order in each set as indicated by counter i. Because the flight information of coupon a$_2$ is different from the flight information of coupon b$_2$, the exchange server 26 may determine that coupon a$_2$ does not match coupon b$_2$, i.e., that a$_2$≠b$_2$.

In response to determining that a$_2$≠b$_2$, the exchange server 26 may set the value of operator a'$_2$ of set A' and operator b'$_2$ of set B' to true. The exchange server 26 may also select the latest occurring coupon in chronological order from each of set A and set B (e.g., coupon a$_4$ of set A and coupon b$_4$ of set B) based on the value of counter j and the number of coupons in each set, and compare the selected coupons, as indicated by double arrowed line 204. Because the flight information for each of these coupons is the same, the exchange server 26 may determine that a$_4$=b$_4$. In response to determining that a$_4$=b$_4$, the exchange server 26 may further determine if the value of operator a'$_4$ of set A' or operator b'$_4$ of set B' is true. In the present example, since neither operator a'$_4$ nor operator b'$_4$ has been set to true, the exchange server 26 may determine that neither operator has a value of true. As a result of this determination, the exchange server 26 may set the value of each of these operators to false, add a link d$_4$=(a$_4$, b$_4$) to set D, and increment counter j to 1.

The exchange server 26 may then select the next latest coupon in chronological order from each of set A and set B (e.g., coupon a$_3$ of set A and coupon b$_3$ of set B) based on the value of counter j, and compare the selected coupons, as indicated by double arrowed line 206. Because the flight information for each of these coupons is the same, and neither operator a'$_3$ nor operator b'$_3$ has been set to true, the exchange server 26 may set the value of each of these operators to false, add a link $d_3=(a_3, b_3)$ to set D, and increment counter j to 2.

The exchange server 26 may then select the next latest coupon in chronological order from each set based on the value of counter j (e.g., coupon $a_2$ of set A and coupon $b_2$ of set B) and compare the coupons, as indicated by double arrowed line 208. In response to determining that $a_2 \neq b_2$, the exchange server 26 may set the value of operator $a'_2$ to true, set the value of operator $b'_2$ to true, add link $d_2=(a_2, b_2)$ to set D, and end the analysis.

FIG. 15 depicts an application of the above described process 130 to the exemplary set 180 of coupons 182-185 and another exemplary set 210 of coupons 212-215 (e.g., set B of coupons $b_1$-$b_4$) from a reissue ticket in which coupons $b_1$ and $b_2$ have replaced coupons $a_1$ and $a_2$.

The exchange server 26 may begin the analysis by initializing the counters and selecting the earliest coupons in chronological order from each of set A and set B, e.g., coupon $a_1$ and coupon $b_1$ as indicated by counter i. The exchange server 26 may compare the selected coupons $a_1$ and $b_1$ (as indicated by double arrowed line 220) to determine if they have the same flight information. In response to determining that the coupons do not have the same flight information (i.e., $a_1 \neq b_1$), the exchange server 26 may set the values of operator $a'_1$ of set A' and operator $b'_1$ of set B' to true.

The exchange server 26 may then select the latest occurring coupon in chronological order from each of set A and set B (e.g., coupon $a_4$ of set A and coupon $b_4$ of set B), and compare the selected coupons, as indicated by double arrowed line 222. Because the flight information for each of these coupons is the same, the exchange server 26 may determine that $a_4=b_4$. In response to determining that $a_4=b_4$, the exchange server 26 may further determine if the value of operator $a'_4$ of set A' or operator $b'_4$ of set B' is true. Because neither operator $a'_4$ nor operator $b'_4$ has been set to true, the exchange server 26 may set the value of each of these operators to false, add a link $d_4=(a_4, b_4)$ to set D, and increment counter j to 1.

The exchange server 26 may then select the next latest coupon in chronological order from each of set A and set B (e.g., coupon $a_3$ of set A and coupon $b_3$ of set B) based on the value of counter j, and compare the selected coupons, as indicated by double arrowed line 224. Because the flight information for each of these coupons is the same, and neither operator $a'_3$ nor operator $b'_3$ has been set to true, the exchange server 26 may set the value of each of these operators to false, add a link $d_3=(a_3, b_3)$ to set D, and increment counter j to 2.

The exchange server 26 may then select the next latest coupon in chronological order from each of set A and set B (e.g., coupon $a_2$ of set A and coupon $b_2$ of set B) based on the value of counter j, and compare the selected coupons, as indicated by double arrowed line 226. In response to determining that $a_2 \neq b_2$, the exchange server 26 may set the values of operators $a'_1$, $a'_2$, $b'_1$, and $b'_2$ to true, add links $d_1=(a_1, b_1)$ and $d_2=(a_2, b_2)$ to set D, and end the analysis.

Figure 16:
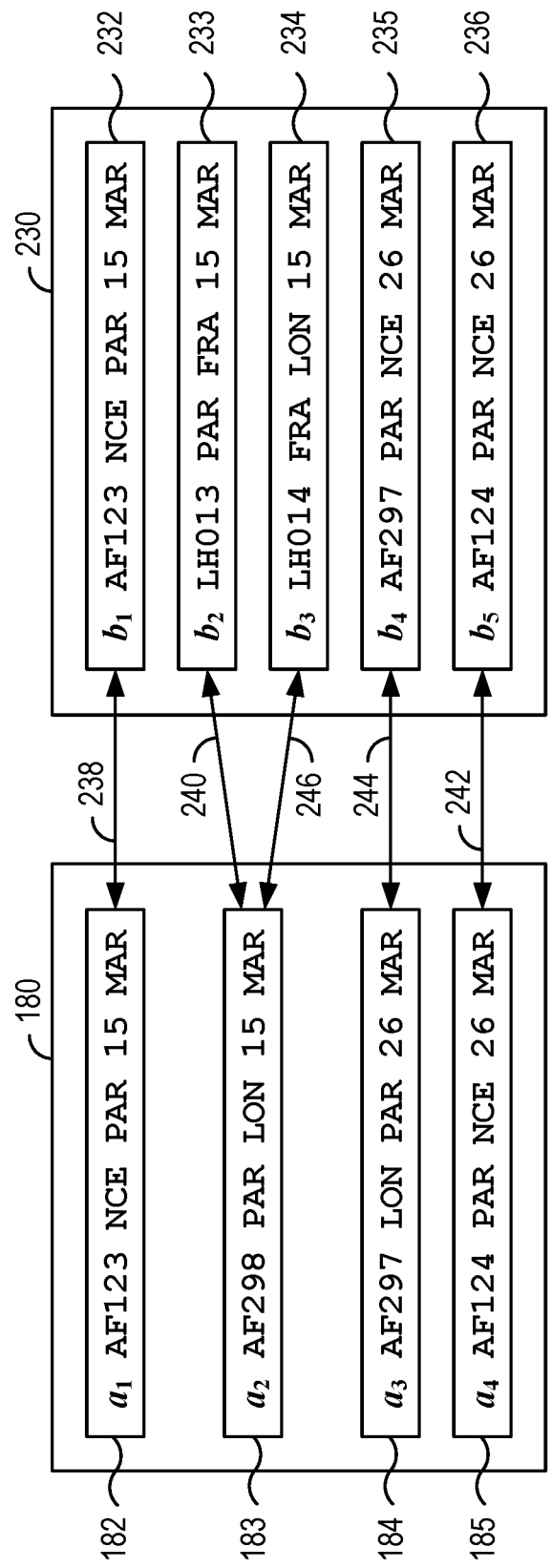

FIG. 16 depicts an application of the above described process 130 to the exemplary set 180 of coupons 182-185 and an exemplary set 230 of coupons 232-236 (e.g., set B of coupons $b_1$-$b_5$) from a reissue ticket in which coupons $b_2$ and $b_3$ replace coupon $a_2$.

Exchange server 26 may begin the analysis by initializing the counters and selecting the earliest coupons $a_1$ and $b_1$ from their respective sets A and B. The exchange server 26 may compare the selected coupons (as indicated by double arrowed line 238), determine they have the same flight information, and that both coupon $a_2$ exists in set A, and coupon $b_2$ exists in set B. In response to these determinations, the exchange server 26 may set the values of operator $a'_1$ of set A' and operator $b'_2$ of set B' to false, add a link $d_1=(a_1, b_1)$ to set D, and increment counter i to 2.

The exchange server 26 may then select the next earliest coupon in chronological order from each of set A and set B (e.g., coupon $a_2$ of set A and coupon $b_2$ of set B) based on the value of counter i, and compare the selected coupons, as indicated by double arrowed line 240. Because the flight information for coupon $a_2$ is different than the flight information of coupon $b_2$, the exchange server 26 may determine that $a_2 \neq b_2$. In response to this determination, the exchange server 26 may set the values of operators $a'_2$ of set A' and operator $b'_2$ of set B' to true, select the latest occurring coupon in chronological order from each of set A and set B (e.g., coupon $a_4$ of set A and coupon $b_5$ of set B), and compare the selected coupons, as indicated by double arrowed line 242.

Because the flight information for coupons $a_4$ and $b_5$ is the same, the exchange server 26 may determine that $a_4=b_5$. In response to determining that $a_4=b_5$, the exchange server 26 may further determine if the value of operator $a'_4$ of set A' or operator $b'_5$ of set B' is true. Because neither operator $a'_4$ nor operator $b'_5$ has been set to true, the exchange server 26 may set the value of each of these operators to false, add a link $d_5=(a_4, b_5)$ to set D, and increment counter j to 1.

The exchange server 26 may then select the next latest coupon in chronological order from each of set A and set B (e.g., coupon $a_3$ of set A and coupon $b_4$ of set B) based on the value of counter j, and compare the selected coupons, as indicated by double arrowed line 244. Because the flight information for each of these coupons is the same, and neither operator $a'_3$ nor operator $b'_4$ has been set to true, the exchange server 26 may set the value of each of these operators to false, add a link $d_4=(a_3, b_4)$ to set D, and increment counter j to 2.

The exchange server 26 may then select the next latest coupon in chronological order from each of set A and set B (e.g., coupon $a_2$ of set A and coupon $b_3$ of set B) based on the value of counter j, and compare the selected coupons, as indicated by double arrowed line 246. In response to determining that $a_2 \neq b_3$, the exchange server 26 may set the values of operators $a'_2$, $b'_2$, and $b'_3$ to true, add links $d_2=(a_2, b_2)$ and $d_3=(a_2, b_3)$ to set D, and end the analysis.

FIG. 17 depicts an application of the above described process 130 to the set 180 of coupons 182-185 and an exemplary set 250 of coupons 252-254 (e.g., set B of coupons $b_1$-$b_3$) from a reissue ticket in which the flight corresponding to coupons $a_1$ and $a_2$ was replaced with a direct flight corresponding to coupon $b_1$.

The exchange server 26 may initialize the counters, select the earliest coupons $a_1$ and $b_1$ from their respective sets A and B, and compare the selected coupons $a_1$ and $b_1$, as indicated by double arrowed line 256. In response to determining the coupons do not have the same flight information, the exchange server 26 may set the values of operator $a'_1$ of set A' and operator $b'_1$ of set B' to true, select the latest occurring coupon in chronological order from each of set A and set B (e.g., coupon $a_4$ of set A and coupon $b_3$ of set B), and compare the selected coupons as indicated by double arrowed line 258.

In response to determining that $a_4=b_3$, the exchange server 26 may determine if the value of operator $a'_4$ of set A' or operator $b'_3$ of set B' is true. Because neither operator $a'_4$ nor operator $b'_3$ has been set to true, the exchange server 26 may set the value of each of these operators to false, add a link $d_4=(a_4, b_3)$ to set D, and increment counter j to 1.

The exchange server 26 may then select the next latest coupon in chronological order from each of set A and set B (e.g., coupon $a_3$ of set A and coupon $b_2$ of set B) based on the value of counter j, and compare the selected coupons, as indicated by double arrowed line 260. In response to determining that $a_3=b_2$, the exchange server 26 may determine if the value of operator $a'_3$ of set A' or operator $b'_2$ of set B' is true. Because neither operator $a'_3$ nor operator $b'_2$ has been set to true, the exchange server 26 may set the value of each of these operators to false, add a link $d_3=(a_3, b_2)$ to set D, and increment counter j to 2.

The exchange server 26 may then select the next latest coupon in chronological order from each of set A and set B (e.g., coupon $a_2$ of set A and coupon $b_1$ of set B) based on the value of counter j, and compare the selected coupons, as indicated by double arrowed line 262. In response to determining that $a_2 \neq b_1$, the exchange server 26 may set the values of operators $a'_1$, $a'_2$, and $b'_1$ to true, add link $d_2=(a_2, b_1)$ to set D, and end the analysis.

FIG. 18 depicts an application of the above described process 130 to the set 180 of coupons 182-185 and an exemplary set 270 of coupons 272, 274 (e.g., set B of coupons $b_1$-$b_2$) from a reissue ticket in which the flight corresponding to coupons $a_1$ and $a_2$ has been canceled.

The exchange server 26 may initialize the counters, select the earliest coupons $a_1$ and $b_1$ from their respective sets A and B, and compare the selected coupons $a_1$ and $b_1$, as indicated by double arrowed line 276. In response to determining the coupons do not have the same flight information, the exchange server 26 may set the values of operator $a'_1$ of set A' and operator $b'_1$ of set B' to true.

The process 130 may then select the latest occurring coupon in chronological order from each of set A and set B (e.g., coupon $a_4$ of set A and coupon $b_2$ of set B), and compare the selected coupons, as represented by double arrowed line 278. In response to determining that $a_4=b_2$, the exchange server 26 may determine if the value of operator $a'_4$ of set A' or operator $b'_2$ of set B' is true. Because neither operator $a'_4$ nor operator $b'_2$ has been set to true, the exchange server 26 may set the value of each of these operators to false, add a link $d_4=(a_4, b_2)$ to set D, and increment counter j to 1.

The exchange server 26 may then select the next latest coupon in chronological order from each of set A and set B (e.g., coupon $a_3$ of set A and coupon $b_1$ of set B) base on the value of counter j, and compare the selected coupons, as represented by double arrowed line 280. The exchange server 26 may determine that the flight information for each of these coupons is the same. However, the exchange server 26 may further determine that operator $b'_1$ has been set to true as a result of the previous comparison with coupon $a_1$. In response to determining that operator $b'_1$ has been set to true, the exchange server 26 may set operator $b'_1$ to false, set the value of operators $a'_1$ and $a'_2$ to true, add links $d_1=(a_1, \emptyset)$, $d_2=(a_2, \emptyset)$, and $d_3=(a_3, b_1)$ to set D, and end the analysis.

Once the disrupted coupons in the parent ticket and their corresponding replacement coupons in the reissue ticket have been identified and linked, the exchange server 26 may store this information in a database record for future use. However, ticket and reservation records may be required to adhere to certain standard formats so that compatibility is maintained between various carrier, travel agency, and GDS systems. Thus, it may not be possible to add new types of data to or otherwise modify ticket and reservation records to store the additional non-standard data generated by the exchange server 26.

To provide a record for storing the non-standard data generated by the exchange server 26, embodiments of the invention may use transitional records. Transitional records may include data fields that are used by the exchange server 26 to track old fare component and coupon data, and may comprise a new type of database record that is used by the exchange server 26 to provide various features of embodiments of the present invention. Transitional records may store information that provides a full exchange history of a reissue ticket. The information stored in a transaction record may be associated with a specific reservation record, and may include a copies of each coupon of the current itinerary as well as fare and coupon information from any originally priced and purchased ticket coupons that are linked to a coupon of the current itinerary.

Figure 19:
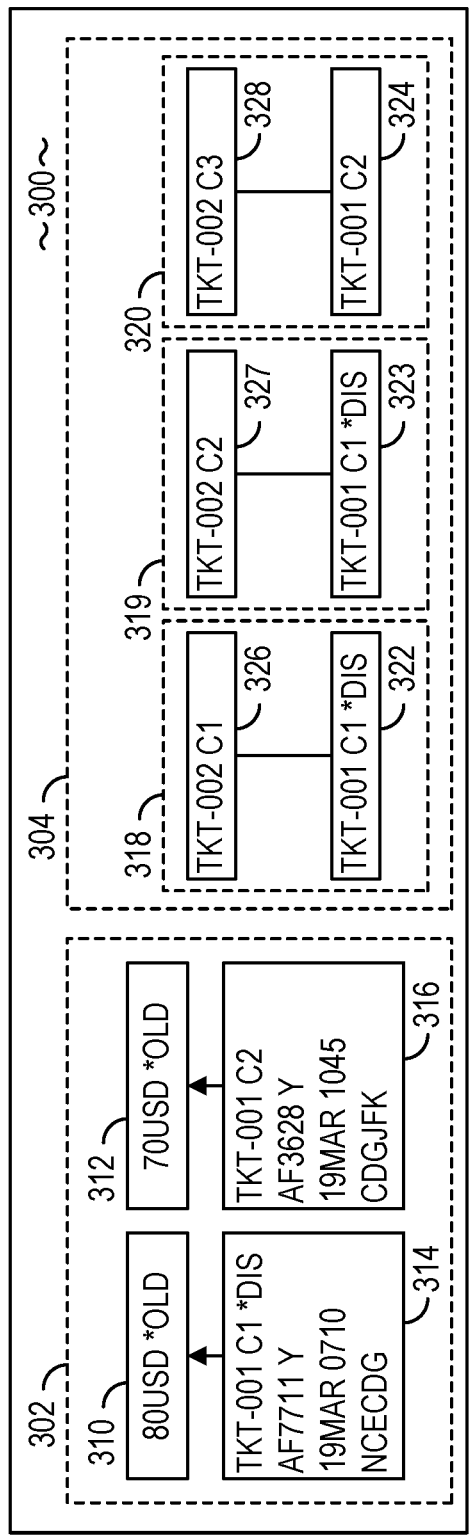
FIG. 19 is a diagrammatic view of a transitional record that includes a disruption index which may be determined based on the exchange index of FIG. 9.

FIG. 19 depicts an exemplary transitional record 300 in accordance with an embodiment of the invention that includes a fare structure index 302 and a disruption index 304. The transitional record 300 may also include flags (not shown) indicating the process that generated the record, and whether the transitional record 300 was generated based on more than one original ticket.

The fare structure index 302 may store data describing the originally issued ticket prior to any exchanges, including details of fare components and coupons of the original ticket. This data may remain unmodified by the exchange process except for the addition of disruption flags, which may be updated after each exchange. The fare structure index 302 may thereby allow the database management system 12 to process ticket exchanges without retrieving the original ticket from the ticket database 20.

The fare structure index 302 may include fare elements 310, 312 and product elements 314, 316. Each fare element 310, 312 may store fare data for a coupon of the original ticket, and may be linked to a corresponding product element 314, 316 to define a data structure 315, 317. Each product element may store data identifying the ticket and coupon corresponding to the fare element to which the product element is linked. The fare structure index 302 may also contain base fare and tax data from the originally purchased ticket.

The disruption index 304 may provide a mapping of exchanges for each coupon based on data from one or more exchange indexes, and may be updated each time a ticket is exchanged. By allowing the database management system 12 to match coupons from reissue tickets with corresponding coupons of the original as well as any other intervening parent tickets, the disruption index 304 may enable later processing of reissue tickets that would not be possible using systems that lack this feature.

The disruption index 304 may include one or more arrays 318-320 each defining a set of linked data elements. Each array 318-320 may include a coupon element 322-324 corresponding to a coupon field from a parent ticket, and a coupon element 326-328 corresponding to a coupon field from a reissue ticket. The arrays 318-320 may be arranged within the disruption index 304 as a series of arrays ordered from the earliest array (e.g., the array having data elements corresponding to coupons with the earliest departure time) to the latest array (e.g., the array having data element corresponding to coupons with the latest departure time).

Coupon elements 322-324 may correspond to the coupons of set A, the coupon elements 326-328 may correspond to the coupons of set B, and the links between the coupon elements may be defined by links d of set D of a corresponding disruption index generated in association with the exchange of a parent ticket (e.g., TKT-001) for a reissue ticket (e.g., TKT-002). Coupon elements associated with a disruption (e.g., coupon elements 322 and 323) may be flagged as disrupted. The status of coupon elements may be defined by setting the value of an associated operator $a'_g$ and/or $b'_h$ to true (disrupted) or false (not disrupted) in set A' and/or set B' of the corresponding exchange index.

By way of example, the transitional record 300 may be described in accordance with the exemplary exchange of ticket TKT-001 for ticket TKT-002, as described above with respect to FIGS. 3-6. In this example, fare element 310 may store data defining fare information for coupon C1 of ticket TKT-001. The fare information may include the amount of the fare (e.g., 80 USD) and a status flag (e.g., "*OLD") indicating that the fare was priced for a coupon that has been exchanged. The associated product element 314 may store data defining product information for the exchanged product, e.g. data identifying the specific segment for which coupon C1 of ticket TKT-001 could have been used to obtain a boarding pass. Product element 314 may also include the status flag indicating that the product was disrupted (e.g., *DIS).

The latest data element 326-328 in each array 318-321 may store data that defines details of coupons that are part of the current itinerary, and may be used to define a hybrid ticket. The coupons in the hybrid ticket may have a one-to-one correspondence with the reissued ticket in the ticket database in the case of a full exchange, or may contain coupons from each of multiple tickets in the ticket database 20 in the case of a partial exchange.

In the current example, coupon element 326 may include data identifying coupon C1 of ticket TKT-002, which may have been issued in exchange for coupon C1 of ticket TKT-001. Accordingly, coupon element 326 may be linked to coupon element 322, which may include data identifying coupon C1 of ticket TKT-001, and which may be flagged as corresponding to the disruption.

Coupon element 327 may include data identifying exemplary coupon C2 of ticket TKT-002, which was also issued in exchange for coupon C1 of ticket TKT-001. Accordingly, coupon element 327 may be linked to coupon element 323, which may also include data identifying coupon C1 of ticket TKT-001 and be flagged as corresponding to the disruption. Coupon element 328 may include data identifying exemplary coupon C3 of ticket TKT-002 which was issued in exchange for coupon C2 of ticket TKT-001. Accordingly, coupon element 328 may be linked to coupon element 324, which may include data identifying coupon C2 of ticket TKT-001. However, because coupon C2 does not correspond to the disruption that triggered the exchange of ticket TKT-001 for ticket TKT-002, coupon element 324 may not contain a flag indicating coupon C2 of ticket TKT-001 is associated with the disruption. Collectively, the arrays 318-320 of disruption index 304 may provide an exchange history for the coupons comprising the current itinerary of the traveler.

Subsequent to the disruption that resulted in ticket TKT-001 being exchanged for ticket TKT-002, another disruption may occur. In response to this later occurring disruption, an agent for the carrier or an automated re-accommodation application may alter the itinerary by substituting a replacement segment or segments for the disrupted segment or segments. For example, if the Paris to New York segment reserved by segment S3 of reservation record 89DRGH as shown in image 61 (FIG. 5) is canceled, (e.g., due to a mechanical failure or lack of a flight crew), the segment S3 may be replaced by another flight.

FIG. 20 depicts an image 63 of an updated reservation record 89DRGH, an image 93 of an updated ticket TKT-002, and an image 340 of a reissue ticket TKT-003, which may have been issued in exchange for ticket TKT-002. As shown by image 63, segment field 330 and segment field 332 of reservation record 89DRGH define segments S3 and S4, which have replaced disrupted segment S3 in segment field 69 of reservation record 89DRGH as shown by image 61.

Ticket image 340 may include a ticket number field 342 that contains data which identifies the ticket (e.g., TKT-003), a record locator field 344, a passenger name field 346, a number of coupon fields 348-351, and a number of fare component fields 356-359. Each of the coupons C1-C4 may correspond to a respective segment S1-S4 defined in the updated reservation record 89DRGH as depicted by image 63. Because the change is involuntary, the total fare may again remain unchanged from the initially booked flight.

Following the exchange, the corresponding parent ticket records in the ticket database 20 may be updated to reflect the current status of each coupon. For example, the total fare for the replacement coupons C3 and C4 in ticket TKT-003 may be set to 80 USD to maintain the total fare at the originally ticketed price, and the status of coupons C1, C2, and C3 in the parent ticket TKT-002 may be set to "E" to indicate that the coupons have been exchanged. The original ticket TKT-001 may remain unchanged, in which case ticket TKT-001 may remain as depicted by image 71 (FIG. 6). Once the reissue ticket TKT-003 has been issued, the exchange server 26 may analyze the ticket records, generate an exchange index, and update the transitional record 300 to reflect the changes.

Figure 21:
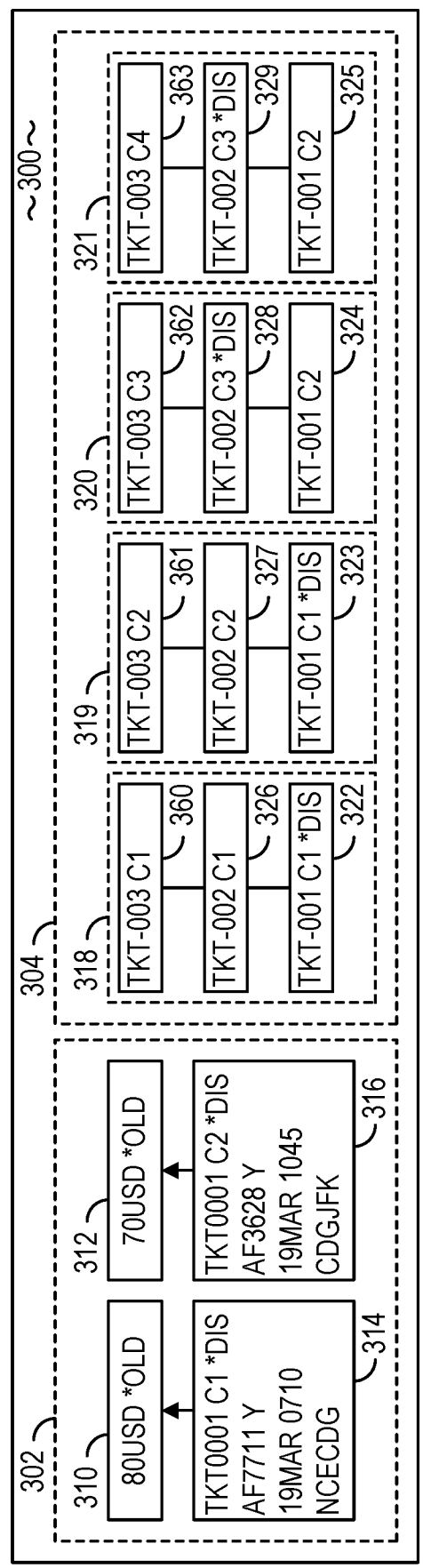
FIG. 21 is a diagrammatic view of the transitional record from FIG. 19 as it may appear after issuing the reissue tickets of FIG. 20.

FIG. 21 depicts how the transitional record 300 may appear after issuance of ticket TKT-003 in accordance with the above example. In the exemplary embodiment depicted, disruption index 304 includes new coupon elements 360-363 that contain data identifying the coupons which were issued to replace the coupons of ticket TKT-002. Each coupon element 360-363 may be associated with a corresponding array 318-321 that provides an exchange history for the associated coupon element 360-363. Coupon elements 328 and 329 may include a disruption flag to indicate that these coupons correspond to the latest or most recent disruption.

The fare elements 310, 312 and product elements 314, 316 may store additional data not shown in FIGS. 19 and 21. Additional types of data that may be stored in the fare elements 310, 312 may include data that identifies or defines a fare component number, a base fare, a number of loyalty points, an origin, a destination, a trip indicator, a fare basis code and ticket designator, a fare family code and owner, passenger facility charges, taxes, and/or other fees. Types of additional data that may be stored in the product elements 314, 316 may include a coupon number, a flight number, an operating airline code, a booking class, airport codes for the departure and arrival airports, departure and arrival times, an original ticket number, and the presence or absence of the disruption flag. The product elements 314, 316 may include all the segments involved in the fare computation of the original ticket, including segments that have been flown.

In response to input indicating a user wishes to view a ticket, a client application running on the user system 14 may transmit a display query to the database management system 12. In response to receiving the query, the database management system 12 may query the ticket database 20 for a ticket identified in the query, and/or the transitional record database 28 for a transitional record corresponding to the ticket. The database management system 12 may use the data from the transitional record to enrich the data from the ticket record, and transmit a response to the client application.

FIG. 22 depicts an image 370 of TKT-001 and an image 400 of TKT-002 that may be displayed in response to the database management system 12 receiving display queries. By way of example, a display query for ticket TKT-001 transmitted prior to the exchange for ticket TKT-002 may cause the user system 14 to display the image 370 of ticket TKT-001. The displayed ticket image 370 includes a ticket number field 372, a record locator field 374, a passenger name field 376, coupon fields 378, 379, a fare calculation line 382, and fare component fields 384, 386.

If the database management system 12 receives a display query for tickets issued from reservation record 89DRGH after the exchange caused by the disruption to the Nice to Paris flight AF7711, database management system 12 may cause the user system 14 to display ticket image 400. Underlined portions of ticket image 400 may represent information added to the ticket image 400 that was generated based on data from the transitional record 300. The displayed ticket image 400 includes a ticket number field 402, a record locator field 404, a passenger name field 406, coupon fields 408-410, a fare calculation line 414, and fare component fields 416, 418. The ticket image 400 may also include original ticket coupon fields 420, 422 that provide information relating to the originally priced and issued ticket. These fields 420, 422 may provide structured fare components and old flown information with coupon details.

The displayed image 400 may include information appended to coupon fields 408 and 409, e.g. "(DIS TKT-001 C1)". This information may link the present coupon to the disrupted coupon it replaces. For example, the information appended to coupons C1 and C2 of TKT-002 may provide an indication that the coupons were issued to replace disrupted coupon C1 from ticket TKT-001. Data (e.g., "FOR TKT-001 C1", "FOR TKT-001 C2") may also be appended to the fare component fields 416, 418 to provide an indication of the source of the fare.

FIG. 23 depicts an image 430 of TKT-003 that may be displayed in response to the database management system 12 receiving a display query subsequent to the exchange of ticket TKT-002 for TKT-003 caused by the disruption to the Paris to New York flight. As with FIG. 22, the underlined portions of image 430 may represent information added to the ticket image 430 based on data from the transitional record 300. The displayed ticket image 430 may include a ticket number field 432, a record locator field 434, a passenger name field 436, coupon fields 438-441, a fare calculation field 446, fare component fields 448, 450, and original ticket coupon data fields 452, 454.

The appended data linking each coupon of TKT-003 to the disrupted coupons from tickets TKT-001 and TKT-002 may provide an exchange history of the respective coupon. For example, the link data appended to coupon C1 in coupon field 438 may inform the user that the coupon is for the same segment as coupon C1 of ticket TKT-002, which in turn was a replacement coupon for disrupted coupon C1 of ticket TKT-001. The link data appended to coupon C2 in coupon field 439 may inform the user that the coupon is for the same segment as coupon C2 of ticket TKT-002, which in turn was a replacement coupon for disrupted coupon C1 of ticket TKT-001. The link data appended to coupons C3 and C4 in coupon fields 440 and 441 may inform the user that each of these coupons replaces coupon C3 of ticket TKT-002, which in turn was a coupon for the same segment as coupon C2 of ticket TKT-001.

Enriched ticket images may be more complex than standard ticket images that adhere to IATA standards, and the presence of non-standard data may cause problems with certain applications. For example, by associating fare components with the original coupons, an enriched ticket image may cause compatibility problems with systems that are required to assign a monetary value to each segment. For instance, a Departure Control System (DCS) could be required to provide a monetary value for each segment in exemplary ticket TKT-003 above. However, because the fare components in ticket TKT-003 are linked to the original coupons C1 and C2 of TKT-001, some systems may be unable to process the enriched ticket.

To enable enriched ticket images to be used by systems having compatibility issues, the exchange server 26 may be configured to mask certain portions of an enriched ticket image in response to determining a requesting system is not compatible with the enriched ticket image. The exchange server 26 may determine when to mask an enriched ticket image, for example, based on the identity of the requesting system, and/or a data field in the query, e.g., if a "standard view only" flag is set in the query. The masking algorithm may create a simplified version of the enriched ticket image using the disruption links stored in the transitional record. These links may allow the exchange server 26 to associate fare components stored in the fare component field to current segments.

FIG. 24 depicts a masked ticket image 460 that may be generated from the enriched ticket image 430. The exchange server 26 may determine from the links defined by the data added to the right portion of the coupon field 438 in image 430 that coupon C1 of ticket TKT-003 is linked to C1 of ticket TKT-001. The exchange server 26 may further determine, based on data in the structured fare component field 448 added to the bottom portion of the ticket image 430, that the applicable fare is FC1. Because the fare components (both in fare calculation and in structured form) are linked to the current flights in the image of the ticket, the client application may not need to display the original flights, which are normally not present in IATA standard tickets. The parent flight information may therefore be masked from image 460 transmitted to the requesting system as shown in FIG. 24.

In some cases, a traveler may wish to voluntary exchange tickets that have been previously subject to an involuntary exchange. This type of exchange may cause issues with determining the exchange value of the parent ticket and pricing the reissue ticket due to the parent ticket having been issued with a non-standard fare. Non-standard fares may result in cases where the traveler cannot be charged for a reissue ticket, and the reservation system therefore determines there is no need to query the fare engine to price the reissue ticket. Thus, the fare for each coupon in a ticket issued as a result of an involuntary exchange may be based on the fare for the previously exchanged ticket prior to the disruption, or hardcoded to predefined values. The price of each coupon in a reissue ticket issued due to an involuntary exchange may therefore not correspond to the normal fare for the replacement itinerary in the reissue ticket. Moreover, in cases where a ticket has been involuntarily exchanged multiple times, the traveler's itinerary may be spread across several tickets, with the coupons in each ticket having one of several statuses, such as flown, exchanged, or open.

FIG. 25 depicts an exemplary ticket image 500 of an original ticket TKT-004 that includes a ticket number field 502, a record locator field 504, a passenger name field 506, coupon fields 508-510, and a fare calculation line 512. TKT-004 includes three coupons for segments comprising a flight on SOUTHWEST AIRLINES® from Louisville to Los Angeles with stops in Chicago and Denver. Ticket image 500 may depict the ticket TKT-004 as it would appear after the traveler has departed for Chicago.

As can be seen, the status of coupon C1 for the segment SDFMDW (Louisville to Chicago) is flown, indicating that this coupon has been used for travel, and the remaining coupons C2 and C3 for segments MDWDEN (Chicago to Denver) and DENLAX (Denver to Los Angeles) are still open. The fare calculation line 512 indicates that the fare for each segment is $258.00. Thus, the total price paid for the originally booked flight from Louisville to Los Angeles was $774.00. If the flight from Chicago to Denver is canceled after the Louisville-Chicago segment has been flown, ticket TKT-004 may be subjected to a partial exchange.

FIG. 26 depicts a ticket image 501 showing ticket TKT-004 as it may appear after the exchange, and ticket image 520 that depicts a reissue ticket TKT-005. Ticket image 520 may include a ticket number field 522, a record locator field 524, a passenger name field 526, coupon fields 528, 530, and a fare calculation field 532. As can be seen in image 501, the status of coupon C2 of ticket TKT-004 has changed to "E", or exchanged, and the status of coupon C3 of ticket TKT-004 remains open. The reissue ticket TKT-005 may include open coupons C1 and C2 that replace coupon C2 of TKT-004. Thus, there may be two live tickets in the ticket database 20 for the un-flown, or "remaining" itinerary of the passenger.

The segment from Chicago to Denver has been replaced by a segment from Chicago to St. Louis, and another segment from St. Louis to Denver. However, the fare element in the reissue ticket TKT-005 may only add an "I-Date" in front of the existing fare element from the parent ticket. The I-Date may merely provide an indication that the ticket was issued on Mar. 19, 2016 in exchange for another ticket. Thus, the fare calculation itself may fail to correspond to the itinerary defined by the reissue ticket.

FIG. 27 depicts an image 503 of ticket TKT-004, an image 521 of ticket TKT-005, and an image 540 of a newly issued ticket TKT-006. Images 503, 521, and 540 may depict tickets TKT-004, TKT-005, and TKT-006 subsequent to coupon C1 of TKT-005 being involuntarily exchanged for TKT-006, e.g., due to a disruption of flight WN0984. At this point, the traveler's remaining itinerary may be spread across three active tickets. Ticket image 540 may include a ticket number field 542, a record locator field 544, a passenger name field 546, coupon field 548, and a fare calculation field 550. As can be seen, TKT-004 may remain unchanged by the latest disruption, the status of coupon C1 of ticket TKT-005 has changed to "E", or exchanged, and reissue ticket TKT-006 may include coupon C1 to replace coupon C1 of TKT-005.

As demonstrated by the above example, the fare element in tickets issued as part of an involuntarily exchange may provide an indication that the fare is based on an involuntarily exchanged ticket. However, the fare element itself may fail to provide information relating to what the fare for either the coupons of the reissue ticket or the replacement itinerary as a whole would be if the ticket had been voluntarily exchanged. Moreover, a complete view may only be provided for the initial paid itinerary in the original ticket. Due to the potential for partial exchanges, open coupons may exist in previous tickets that do not appear in a reissue ticket. In addition, the parent tickets may also include one or more flown coupons. For a voluntary exchange of a ticket having a flown coupon, a new fare calculation may be performed that takes into account flown coupons, and stores an image of the flown coupon in a Binary Large OBject (BLOB) database. However, for an involuntary exchange, flown coupons may fail to appear in a reissue ticket.

With continued reference to FIG. 27, if the traveler requests a voluntary exchange of ticket TKT-006, an agent performing the exchange using conventional systems may know from the fare calculation field 550 that coupon C1 of TKT-005 was exchanged for coupon C1 of TKT-006, but may be unable to view coupon C1 in TKT-004, or even be informed of the existence of ticket TKT-004.

Embodiments of the invention may solve this problem by processing fare data linked to the original itinerary (i.e., the itinerary defined by the original ticket), and routing data linked to the disrupted portion of the itinerary (e.g., the itinerary defined by the reissue ticket). The exchange server 26 may thereby identify which coupons were actually disrupted so that the price of the exchange can be determined based at least in part on whether one or more segments being changed were disrupted. The exchange server 26 may also reconcile the entire itinerary, even if the itinerary is spread across several tickets. This type of multi-ticket reconciliation may require that the exchange server 26 change the coupon status of multiple tickets at once, depending on the type of change requested.

Figure 28:
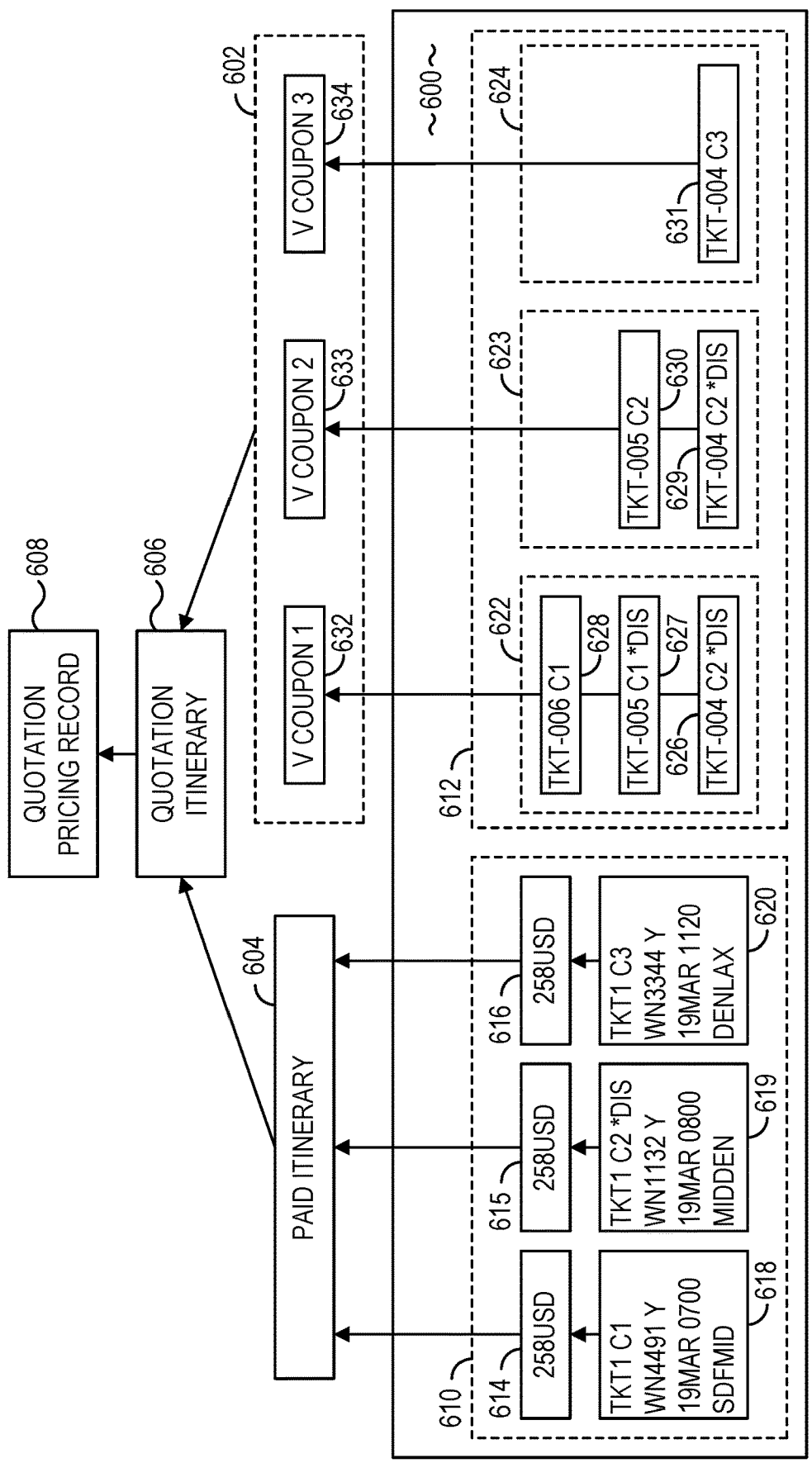
FIG. 28 is a diagrammatic view of an exemplary transitional record as well as a hybrid ticket, a paid itinerary, a quotation itinerary, and a quotation pricing record that may be generated based on data stored in the transitional record.

FIG. 28 depicts an exemplary transitional record 600 that may have been generated during the above described sequence of exchanges, a hybrid ticket 602, a paid itinerary 604, a quotation itinerary 606, and a quotation pricing record 608 that may be generated based on data stored in the transitional record 600. The transitional record 600 may include a fare structure index 610 and a disruption index 612, and may be indexed to the ticket number of each ticket referenced in the transitional record 600, e.g., tickets TKT-004, TKT-005, and TKT-006. The fare structure index 610 may include fare component elements 614-616, each of which may be linked to a corresponding product element 618-620 for the originally priced ticket or tickets, e.g., ticket TKT-004. The disruption index 604 may include one or more arrays 622-624 each defining a set of linked coupon elements 626-631.

Each array 622-624 may comprise a data container that holds a number of coupon elements 626-631 in a specific order. For example, the order may be based on the time at which each coupon element was issued, so that each array 622-624 is configured as a series of coupon elements ordered from the oldest element to the newest element. Each coupon element 626-631 of each array 622-624 may identify a specific coupon in a specific ticket, and a status of the coupon, e.g., disrupted or active. The coupon elements 626-631 may be arranged in an order in their respective array 622-624 that defines a sequence of exchanges. In the exemplary disruption index 612, the earliest coupon element 626 in array 622 may identify coupon C2 of ticket TKT-004 as the earliest coupon to be exchanged, and the last coupon element 628 in array 622 may identify coupon C1 of ticket TKT-006 as the latest coupon issued in the series. The coupon elements in each array may be accessed using an integer index to specify which element in the array is being accessed. For example, within array 622, coupon element 626 may be indexed as element "1", coupon element 627 may be indexed as element "2", and coupon element 628 may be indexed as element "3".

Each array 622-624 may provide an exchange history for the most recently or latest issued coupon of the array back to an "original" coupon. The original coupon identified in each array 622-624 may be the coupon that was last priced, such as a coupon issued in an originally purchased ticket or in a re-issued ticket that was issued as part of a voluntary exchange. In the present example, array 622 includes coupon elements 626-628 identifying one sequence of coupons exchanged for coupon C2 of ticket TKT-004, array 623 includes coupon elements 629 and 630 that identify the another coupon exchanged for coupon C2 of ticket TKT-004, and array 624 includes coupon element 631 identifying coupon C3 of ticket TKT-004, which has yet to be exchanged and is thus still active. The hybrid ticket 602 may include one or more virtual coupons 632-634. Each of the virtual coupons 632-634 may correspond to an open coupon identified by the latest occurring coupon element in each array 622-624.

The indexing provided by transitional records may improve the speed and efficiency with which database records including information relevant to a ticket identified in a database query can be located. The disruption index may identify all coupons associated with an existing itinerary back to the last priced ticket and their full history including disruption indications. This information may be used, for example, to compute a value of a ticket being exchanged, which may be credited towards the price for the exchange.

When a ticket containing only coupons that have been priced is voluntarily exchanged, the exchange process may apply fare calculation rules to the remaining itinerary to determine the exchange value of the ticket. The exchange process may also apply the fare calculation rules to the new itinerary to determine a price for the reissue ticket. The amount that needs to be collected for the exchange may then be determined based on the difference between price of the reissue ticket and the exchange value of the parent ticket. However, if the ticket being exchanged has been subjected to an involuntary exchange, the ticket or tickets being exchanged may include coupons that were never priced. Thus, in order to voluntarily exchange the ticket, the exchange server 26 may need to determine a value for the ticket being exchanged.

Figure 29:
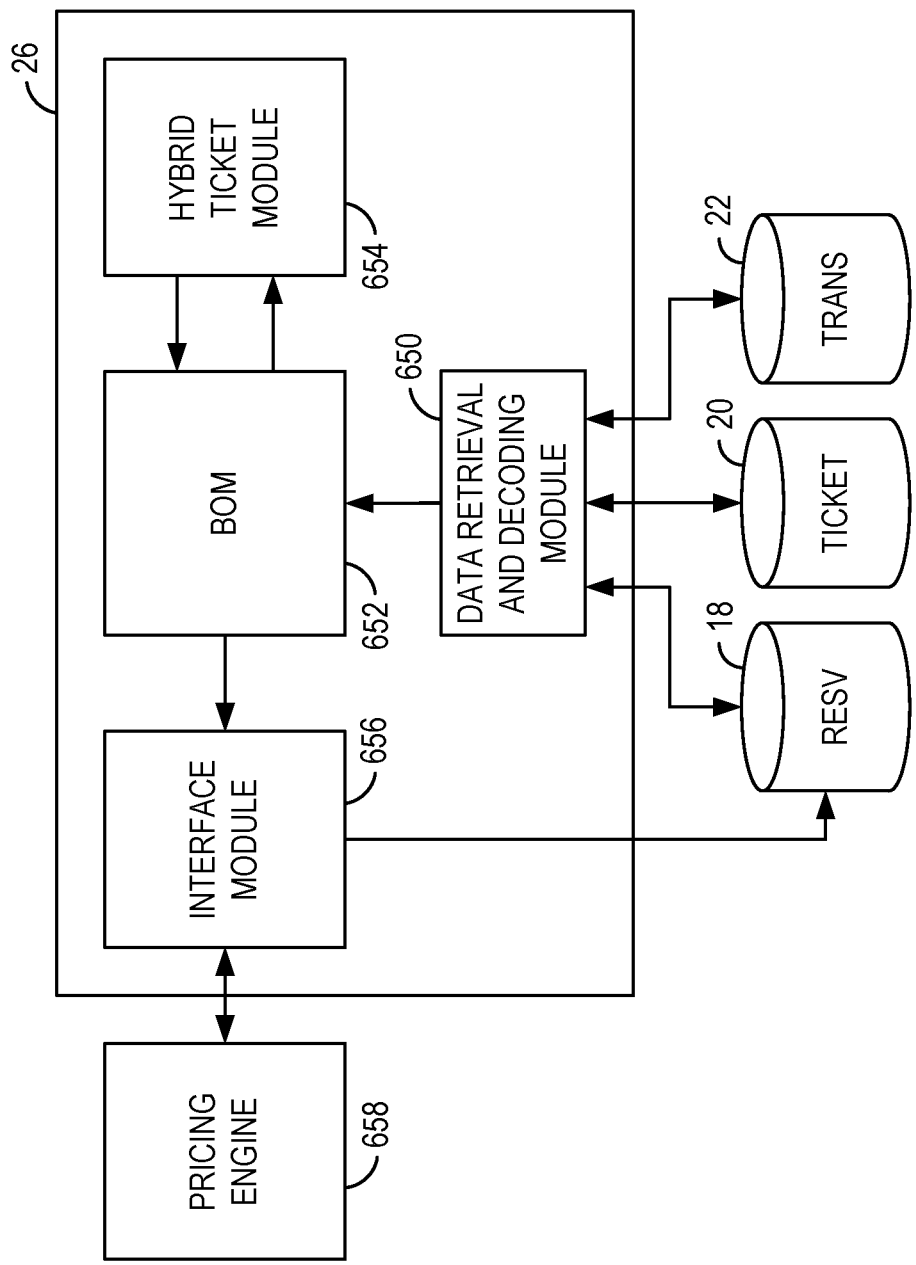
FIG. 29 is a diagrammatic view of the database management system of FIG. 1 showing additional details of the system.

FIG. 29 depicts an embodiment of the exchange server 26 that includes a data retrieval and decoding module 650, a Business Object Model (BOM) 652, a hybrid ticket module 654, and an interface module 656 that communicates with a pricing engine 658.

When a traveler exchanges a ticket, the user system 14 may transmit an exchange request to the exchange server 26 identifying the ticket to be exchanged. In response to receiving the request, the data retrieval and decoding module 650 may query one or more of the reservation database 18, ticket database 20, and/or transitional record database 28 to identify and retrieve data regarding any disruptions, the tickets involved any prior involuntary exchanges, and/or the reservation record history.

The data retrieval and decoding module 650 may decode the received data and store a disruption history in the BOM 652, which provides a container configured to store non-standard data. The data stored in transitional records may enable the data retrieval and decoding module 650 to build a disruption history for the ticket being exchanged. The disruption history may be generated, for example, by querying the ticket database 20 for tickets identified in a transitional record associated with the ticket being exchanged. The tickets returned by the ticket database 20 may be added to a set of tickets, and the set of tickets sorted so that the tickets are arranged in order from the ticket having the earliest timestamp to the ticket having the latest timestamp. The resulting series of database records may provide a list of tickets that starts with the most recently issued ticket which was fully priced, and extends to the ticket being exchanged.

Using the exemplary transitional record 600 as an example, the BOM 652 may call the hybrid ticket module 654 to generate hybrid ticket 602, which the BOM 652 may forward to the interface module 656. The interface module 656 may forward the hybrid ticket 602 to the pricing engine 658 for pricing. The hybrid ticket 602 may include a virtual coupon 632-634 corresponding to each segment from the current itinerary that has yet to be flown, and may enable the exchange server 26 to value involuntarily exchanged tickets using the pricing engine 658. The pricing engine 658 may compute a value of the hybrid ticket 602, which may be used to determine a value for the ticket being exchanged. The BOM 652 may also include or access business rules (e.g., carrier requirements) and an execution object model for applying the fare rules to the virtual coupons 632-634.

Once the disruption history, priced hybrid ticket, and paid itinerary have been generated, the interface module 656 may transmit a reply to the user system 14 that causes the user system 14 to display a data structure in the form of a tree that represents the price of the itinerary, with all pricing details provided by the pricing engine 658. The hybrid ticket 602 may enable the exchange server 26 to perform an automatic calculation that is guaranteed to be correct by the pricing engine 658, and which is based on the faring schema filed by the airline. The input provided to pricing engine 658 may include the full details about the use case, including the passenger, itinerary, and options.

For a voluntary exchange occurring after an involuntary exchange, the interface module 656 may provide details about the paid itinerary (e.g., which parts of the paid itinerary have been disrupted) and the current itinerary after successive disruptions. Using the transitional record 600 and/or BOM 652 to store non-standard data structures, the exchange server 26 may provide enhanced features while preserving the global structure and reusability of the pricing request message. The construction of the hybrid ticket 602 may also enable the different disruption results to be decomposed into a set of factors (e.g., virtual coupons) that can be provided in a standard way to the pricing engine 658 for processing. The interface module 656 may receive the output of the pricing engine 658, and store the results in a fare line of an associated reservation record in the reservation database 18.

Figure 30:
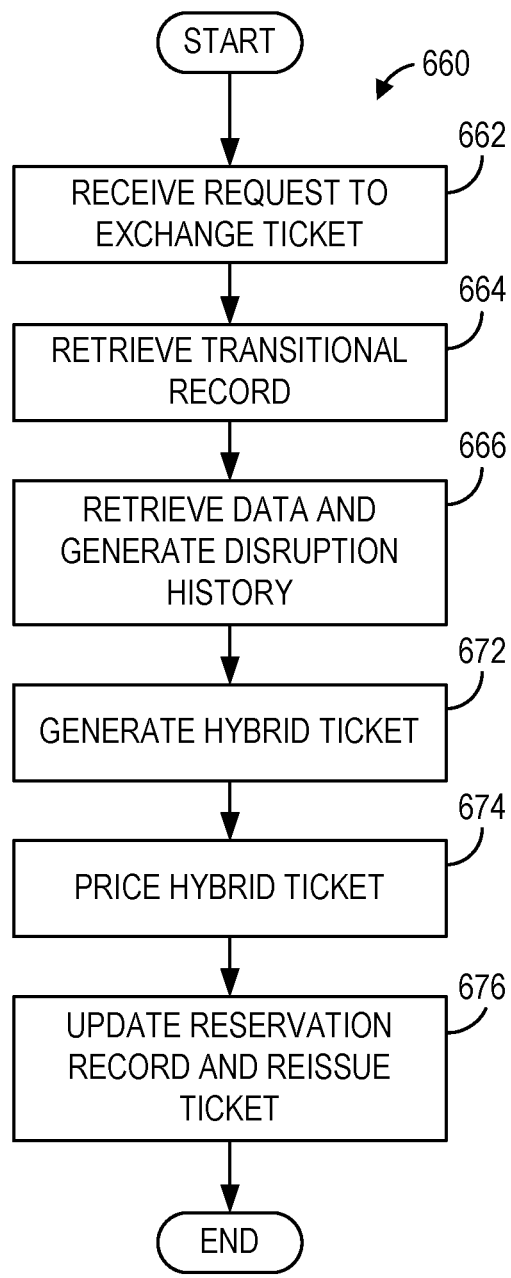
FIG. 30 is a flow-chart of a ticket exchange process that may be implemented by the database management system of FIG. 29.

FIG. 30 depicts a flowchart illustrating an exchange process 660 that may be implemented by the exchange server 26 to process a request for a voluntary exchange of a ticket that has been previously involved in an involuntary exchange. In block 662, the process 660 may receive a request to exchange a ticket, such as ticket TKT-006 described above with respect to FIG. 27. In response to receiving the request, the process 660 may proceed to block 664 and retrieve a transitional record associated with the ticket being exchanged. This retrieval may include, for example, transmitting a query to the transitional record database 28 requesting the database return transitional records indexed to, or containing, the ticket number of the ticket being exchanged. In response, the transitional record database 28 may return a transitional record associated with the ticket, e.g., transitional record 600.

In block 666, the process 660 may retrieve data and generate a disruption history based thereon. FIGS. 31 and 32 depict exemplary files 668 and 670 each comprising a series of EDIFACT commands that may cause the data retrieval and decoding module 650 to retrieve ticket data for use in generating the disruption history. The portions of the EDIFACT command file 668 indicated as "[data]" may be populated with the additional EDIFACT commands, such as those of file 670. The data retrieved by execution of the EDIFACT commands may include tickets involved in the exchange history of the ticket in question that are still active, e.g., that include a coupon with an open status.

The process 660 may identify tickets in the ticket database 20 involved in the exchange history based on data in the transitional record 600. For example, the process 660 may extract ticket numbers from the fare structure index and/or disruption index. Using these ticket numbers, the process 660 may query the ticket database 20 to retrieve the identified tickets. The process 660 may also query the reservation database 18 for a reservation record history. The reservation record history may be used by the process 660 in conjunction with the fare structure index, disruption index, and/or retrieved tickets to generate the disruption history of each active coupon.

The process 660 may generate a full disruption history for the ticket being exchanged based on the retrieved data. The disruption history for the ticket being processed may be spread across multiple data containers (e.g., binary large objects) at the coupon level. These objects may be returned by the transitional record database 28 and/or retrieved from reservation record history data in the reservation database 18. Data containers at the coupon level may be used to aggregate disruption data from multiple objects and build the list of previous tickets to be retrieved.

In an embodiment, the disruption history may be represented by a set of database records comprising a series of tickets $T_1, T_2, \ldots T_n$, in which $T_1$ is the oldest ticket in the series (i.e., the ticket having the earliest timestamp, e.g., the priced ticket), and ticket $T_n$ is the newest ticket in the series (i.e., the ticket having the latest timestamp, e.g., the ticket being exchanged). The exchange server 26 may also cause the retrieved tickets to be displayed by the user system 14 so that the agent is provided with an up-to-date status of the passenger's itinerary.

Once the disruption history has been generated, the process 660 may proceed to block 672 and generate a hybrid ticket (e.g., hybrid ticket 602) that can be sent to the pricing engine 658 to compute a value for the ticket being exchanged. The hybrid ticket may include a coupon corresponding to each segment from the current itinerary that has been or will be flown, and may enable the exchange server 26 to process involuntarily exchanged tickets using the pricing engine 658.

In response to the hybrid ticket being generated, the process 660 may proceed to block 674 and price the hybrid ticket. Pricing the hybrid ticket may include transmitting the hybrid ticket to the pricing engine 658 so that the price is determined based on the faring schema filed by the airline. The process 660 may then proceed to block 676, update the reservation record, and confirm the reissue ticket in the ticket database 20.

A first issuance reference may be used for the creation of an old document (FO) element or line in an itinerary change process. The FO line may reference the original ticket number used for an exchange. A ticket data table may include an issuance envelope number, ticket number, original ticket number, passenger reference, passenger name, and validating carrier fields, and may be used in a re-pricing process to build a new ticket.

Updating the reservation record may include creating a multi-ticket FO line in the reservation record to facilitate exchange of the remaining open coupons. The FO line may include details about the originally issued ticket, the reissue ticket number, and the coupons that are being exchanged. The FO line may identify the coupons that should be exchanged at the time the reissue ticket is issued, thereby guaranteeing the integrity of the exchange. The FO creation process may use a list of successively disrupted tickets that still contain open coupons to build the multi-ticket FO line. This multi-ticket FO line may be in a standard format expected by issuance backend servers. An exemplary FO line may be formatted as shown below:

FO TKT0_City_Date/IATA . . . /TKTnE1/TKTjF3,4/ . . . /TKT1F1,3 . . .

Figure 33:
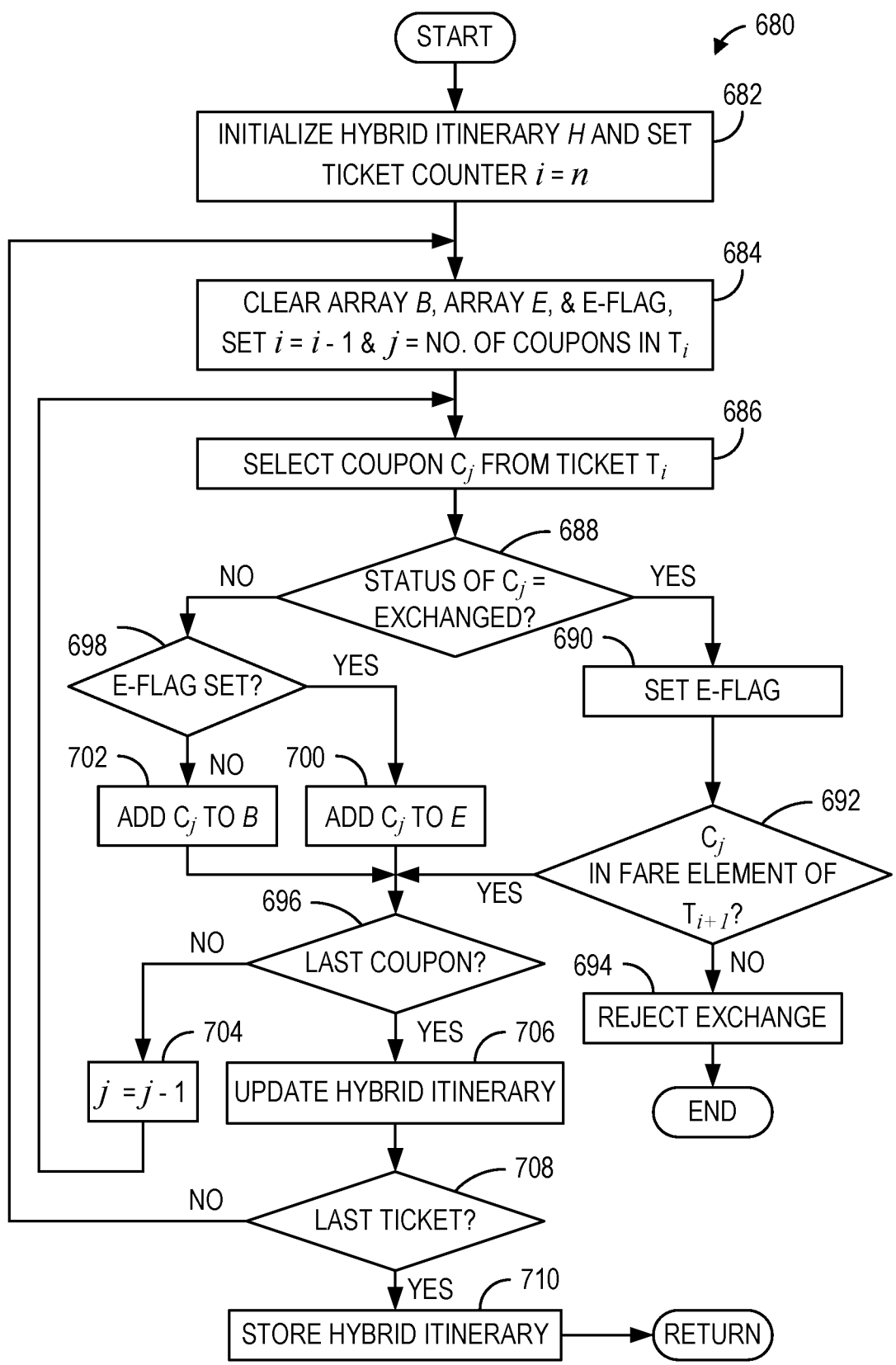
FIG. 33 is a flow-chart of a process that may be implemented by the database management system of FIG. 29 to generate a hybrid itinerary.

FIG. 33 depicts a flowchart illustrating a process 680 that may be used by the exchange server to define a hybrid itinerary from which the hybrid ticket in block 672 of process 660 may be generated. The hybrid itinerary H may comprise an array of coupons extracted from tickets in the disruption history. In block 682, the process 680 may initialize the hybrid itinerary. Initialization may include defining a ticket counter i at an initial value of n (where n is the total number of tickets in the disruption history), and defining hybrid itinerary H as follows:

$$H = C \in T_n$$

where $T_n$ represents the ticket being exchanged so that the hybrid itinerary H initially includes all the coupons C in ticket $T_n$.

In block 684, the process 680 may clear working arrays B and E, and an exchange flag, or "e-flag". The working arrays B and E may be used by the process 680 to temporarily store coupons that will later be appended to either the beginning or the end of a current version of hybrid itinerary H to generate an updated version of the hybrid itinerary H. The e-flag may be used to keep track of whether a coupon having a status of "exchanged" has been encountered while processing a particular ticket. In block 684, the process 680 may also decrement ticket counter i, and initialize a coupon counter j by setting j equal to the number of coupons in ticket $T_i$, which initially may be the parent ticket immediately preceding ticket $T_n$, or ticket $T_{n-1}$. The process 680 may then proceed to block 686 and select coupon $C_j$ from ticket $T_i$.

In block 688, the process 680 may determine if the status of coupon $C_j$ is "exchanged". If the status is "exchanged" ("YES" branch of decision block 688), the process 680 may proceed to block 690, set the e-flag, and proceed to block 692. In block 692, the process 680 may determine if coupon $C_j$ is included in the fare element of previously processed ticket $T_{i+1}$ (i.e., the ticket issued in exchange for ticket $C_j$). If the coupon $C_j$ is not present in the fare element of ticket $T_{i+1}$ ("NO" branch of decision block 692), it may be an indication that the ticket $T_i$ has been exchanged for more than one ticket. In this case, the process 680 may proceed to block 694, reject the exchange, and terminate. If coupon $C_j$ is include in the fare element of previously processed ticket $T_{i+1}$, ("YES" branch of decision block 692), the process 680 may proceed to block 696.

Returning to block 688, if the status of coupon $C_j$ is not "exchanged" ("NO" branch of decision block 688), the process 680 may proceed to block 698. In block 698, the process 680 may determine if the e-flag is set. If the e-flag is set ("YES" branch of decision block 698), the process 680 may proceed to block 700, append coupon $C_j$ to the beginning of working array E, and proceed to block 696. If the e-flag is not set ("NO" branch of decision block 698), the process 680 may proceed to block 702, append the coupon $C_j$ to the beginning of working array B, and proceed to block 696.

In block 696, the process 680 may determine if coupon $C_j$ is the last coupon remaining in ticket $T_i$, i.e., does j=1. If coupon $C_j$ is the not the last coupon remaining in ticket $T_i$, ("NO" branch of decision block 696), the process 680 may proceed to block 704, decrement coupon counter j, and return to block 686 to begin processing the next coupon in ticket $T_i$. If coupon $C_j$ is the last coupon remaining in ticket $T_i$, ("YES" branch of decision block 696), the process 680 may proceed to block 706.

In bock 706, the process 680 may update the hybrid itinerary H by appending the coupons in working array B to the beginning of the hybrid itinerary H, and appending the coupons in working array E to the end of itinerary H. That is, update hybrid itinerary H as follows:

$$H_m = B + H_{m-1} + E.$$

The process 680 may then proceed to block 708 and determine if ticket $T_i$ is the last ticket, i.e., if i=1. If ticket $T_i$ is not the last ticket ("NO" branch of decision block 708), the process 680 may return to block 684 and begin processing the next ticket. If ticket $T_i$ is the last ticket ("YES" branch of decision block 708), the sub-process 680 may proceed to block 710, store the hybrid itinerary, and return to the main process 660.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, web based services, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, and/or operations specified in the flow charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow charts, sequence diagrams, and/or block diagrams.

In certain alternative embodiments, the functions, acts, and/or operations specified in the flow charts, sequence diagrams, and/or block diagrams may be re-ordered, processed serially, and/or processed concurrently consistent with embodiments of the invention. Moreover, any of the flow charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, actions, steps, operations, elements, and/or components, but do not preclude the presence or addition of one or more other features, integers, actions, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A travel management system for processing tickets in the event of an involuntary ticket exchange, the travel management system comprising:
one or more processors; and
a memory coupled to the one or more processors, the memory storing program code that, when executed by the one or more processors, causes the travel management system to:
receive a query identifying a reissue ticket stored in a ticket database, wherein the reissue ticket is associated with a previous exchange of a parent ticket;
retrieve, from a transitional database, a transitional record indexed to the reissue ticket, the transitional record containing a disruption index that includes at least one array which defines a set of linked coupon elements, wherein each linked coupon element is associated with a status and at least one of the linked coupon elements corresponds to a coupon from the parent ticket;
in response to a disruption, determine the coupon from the parent ticket has not been exchanged based on the status associated with the at least one of the linked coupon elements corresponding to the coupon from the parent ticket;
identify, based on determining the coupon from the parent ticket has not been exchanged, a set of tickets in the ticket database that include at least one of the linked coupon elements, the set of tickets including the parent ticket, the reissue ticket, and a replacement ticket;
generate a disruption history from the set of tickets, including:
initializing a first array with coupon elements from the parent ticket and the reissue ticket,
adding at least one coupon element from the replacement ticket to the first array,
selecting a latest previously unselected coupon element from the replacement ticket,
determining a status of the selected coupon element,
in response to the status indicating the selected coupon element was exchanged, setting an exchange flag and discarding the selected coupon element,
in response to the status indicating the selected coupon element was not exchanged, adding the selected coupon element to one of a second array or a third array,
in response to the selected coupon element being the earliest coupon element of the replacement ticket, update the disruption history by:
appending the second array to the first array before the earliest coupon element of the first array, and
appending the third array to the first array after the latest coupon element of the first array; and
generate a hybrid ticket from the disruption history, including:
determining a first value for the hybrid ticket using a pricing engine,
assigning the first value to the reissue ticket,
determining a second value for the replacement ticket using the pricing engine,
determining a third value equal to a difference between the second value and the first value, and
assigning the third value to the replacement ticket.

2. The travel management system of claim 1, wherein the program code causes the travel management system to add the selected coupon element to one of the first array or the second array by:
adding the selected coupon element to the second array if the exchange flag is not set; and
adding the selected coupon element to the third array if the exchange flag is set.

3. The travel management system of claim 1, wherein each ticket in the set of tickets has a timestamp indicating a time when the ticket was added to the ticket database, the timestamp of the replacement ticket occurring after the timestamp of the reissue ticket, and the program code further causes the travel management system to:
in response to the status indicating the selected coupon element was exchanged, determine if the selected coupon element appears in a fare element of the replacement ticket, and
if the selected coupon element does not appear in the fare element of the replacement ticket, abort processing of the tickets.

4. The travel management system of claim 1 wherein each ticket in the set of tickets has a timestamp indicating a time when the ticket was added to the ticket database, and the program code further causes the travel management system to:
sort the set of tickets based on the timestamp of each ticket so that the set of tickets is configured as a series of tickets ordered from the ticket having an earliest timestamp to the ticket having a latest timestamp.

5. A method of processing tickets in the event of an involuntary ticket exchange, the method comprising:
receiving a query identifying a reissue ticket stored in a ticket database, wherein the reissue ticket is associated with a previous exchange of a parent ticket;
retrieving, from a transitional database, a transitional record indexed to the reissue ticket, the transitional record containing a disruption index that includes at least one array which defines a set of linked coupon elements, wherein each linked coupon element is associated with a status and at least one of the linked coupon elements corresponds to a coupon from the parent ticket;
determining, in response to a disruption, the coupon from the parent ticket has not been exchanged based on the status associated with the at least one of the linked coupon elements corresponding to the coupon from the parent ticket;
identifying, based on determining the coupon from the parent ticket has not been exchanged, a set of tickets in the ticket database that include at least one of the linked coupon elements, the set of tickets including the parent ticket, the reissue ticket, and a replacement ticket;
generating a disruption history from the set of tickets, including:
initializing a first array with coupon elements from the parent ticket and the reissue ticket, adding at least one coupon element from the replacement ticket to the first array,
selecting a latest previously unselected coupon element from the replacement ticket,
determining a status of the selected coupon element,
in response to the status indicating the selected coupon element was exchanged, setting an exchange flag and discarding the selected coupon element,
in response to the status indicating the selected coupon element was not exchanged, adding the selected coupon element to one of a second array or a third array,
in response to the selected coupon element being the earliest coupon element of the replacement ticket, update the disruption history by:
appending the second array to the first array before the earliest coupon element of the first array, and
appending the third array to the first array after the latest coupon element of the first array; and
generating a hybrid ticket from the disruption history, including:
determining a first value for the hybrid ticket using a pricing engine,
assigning the first value to the reissue ticket,
determining a second value for the replacement ticket using the pricing engine,
determining a third value equal to a difference between the second value and the first value, and
assigning the third value to the replacement ticket.

6. The method of claim 5, wherein adding the selected coupon element to one of the first array or the second array comprises:
adding the selected coupon element to the second array if the exchange flag is not set; and
adding the selected coupon element to the third array if the exchange flag is set.

7. The method of claim 5, wherein each ticket in the set of tickets has a timestamp indicating a time when the ticket was added to the ticket database, the timestamp of the replacement ticket occurring after the timestamp of the reissue ticket, and further comprising:
in response to the status indicating the selected coupon element was exchanged, determining if the selected coupon element appears in a fare element of the replacement ticket; and
if the selected coupon element does not appear in the fare element of the replacement ticket, aborting processing of the tickets.

8. The method of claim 5 wherein each ticket in the set of tickets has a timestamp indicating a time when the ticket was added to the ticket database, and further comprising:
sorting the set of tickets based on the timestamp of each ticket so that the set of tickets is configured as a series of tickets ordered from the ticket having an earliest timestamp to the ticket having a latest timestamp.

9. The method of claim 5 wherein the disruption history defines a hybrid itinerary.

10. A computer program product for processing tickets in the event of an involuntary ticket exchange, the computer program product comprising:
a non-transitory computer-readable storage medium; and
program code stored on the storage medium that, when executed by one or more processors, causes the one or more processors to:
receive a query identifying a reissue ticket stored in a ticket database, wherein the reissue ticket is associated with a previous exchange of a parent ticket;
retrieve, from a transitional database, a transitional record indexed to the reissue ticket, the transitional record containing a disruption index that includes at least one array which defines a set of linked coupon elements, wherein each linked coupon element is associated with a status and at least one of the linked coupon elements corresponds to a coupon from the parent ticket;
in response to a disruption, determine the coupon from the parent ticket has not been exchanged based on the status associated with the at least one of the linked coupon elements corresponding to the coupon from the parent ticket;
identify, based on determining the coupon from the parent ticket has not been exchanged, a set of tickets in the ticket database that include at least one of the linked coupon elements, the set of tickets including the parent ticket, the reissue ticket, and a replacement ticket;
generate a disruption history from the set of tickets, including:
initializing a first array with coupon elements from the parent ticket and the reissue ticket,
adding at least one coupon element from the replacement ticket to the first array,
selecting a latest previously unselected coupon element from the replacement ticket,
determining a status of the selected coupon element,
in response to the status indicating the selected coupon element was exchanged, setting an exchange flag and discarding the selected coupon element,
in response to the status indicating the selected coupon element was not exchanged, adding the selected coupon element to one of a second array or a third array,
in response to the selected coupon element being the earliest coupon element of the replacement ticket, update the disruption history by:
appending the second array to the first array before the earliest coupon element of the first array, and
appending the third array to the first array after the latest coupon element of the first array; and
generate a hybrid ticket from the disruption history, including:
determining a first value for the hybrid ticket using a pricing engine,
assigning the first value to the reissue ticket,
determining a second value for the replacement ticket using the pricing engine,
determining a third value equal to a difference between the second value and the first value, and
assigning the third value to the replacement ticket.

* * * * *